US008041897B2

United States Patent
Biles et al.

(10) Patent No.: US 8,041,897 B2
(45) Date of Patent: Oct. 18, 2011

(54) CACHE MANAGEMENT WITHIN A DATA PROCESSING APPARATUS

(75) Inventors: Stuart David Biles, Suffolk (GB); Richard Roy Grisenthwaite, Cambridgeshire (GB); David Hennah Mansell, Cambridge (GB)

(73) Assignee: ARM Limited, Cambridge (GB)

( * ) Notice: Subject to any disclaimer, the term of this patent is extended or adjusted under 35 U.S.C. 154(b) by 567 days.

(21) Appl. No.: 12/223,173

(22) PCT Filed: Sep. 18, 2006

(86) PCT No.: PCT/GB2006/003461
§ 371 (c)(1),
(2), (4) Date: Jul. 24, 2008

(87) PCT Pub. No.: WO2007/096572
PCT Pub. Date: Aug. 30, 2007

(65) Prior Publication Data
US 2010/0235579 A1  Sep. 16, 2010

(30) Foreign Application Priority Data

Feb. 22, 2006  (GB) .................................. 0603552.1

(51) Int. Cl.
G06F 12/00  (2006.01)
G06F 12/08  (2006.01)
(52) U.S. Cl. ......... 711/133; 711/125; 711/135; 711/159
(58) Field of Classification Search .......... 711/119–120, 711/125, 133, 135, 159, E12.001, E12.022, 711/E12.02
See application file for complete search history.

(56) References Cited

U.S. PATENT DOCUMENTS

| 5,497,477 A |   | 3/1996 | Trull |
| 6,766,419 B1 | * | 7/2004 | Zahir et al. .................... 711/133 |

(Continued)

FOREIGN PATENT DOCUMENTS

GB  2 345 987  7/2000

(Continued)

OTHER PUBLICATIONS

International Search Report for PCT/GB2006/003461 mailed Jun. 12, 2007.

(Continued)

*Primary Examiner* — Jasmine Song
(74) *Attorney, Agent, or Firm* — Nixon & Vanderhye P.C.

(57) ABSTRACT

A data processing apparatus, and method of managing at least one cache within such an apparatus, are provided. The data processing apparatus has at least one processing unit for executing a sequence of instructions, with each such processing unit having a cache associated therewith, each cache having a plurality of cache lines for storing data values for access by the associated processing unit when executing the sequence of instructions. Identification logic is provided which, for each cache, monitors data traffic within the data processing apparatus and based thereon generates a preferred for eviction identification identifying one or more of the data values as preferred for eviction. Cache maintenance logic is then arranged, for each cache, to implement a cache maintenance operation during which selection of one or more data values for eviction from that cache is performed having regard to any preferred for eviction identification generated by the identification logic for data values stored in that cache. It has been found that such an approach provides a very flexible technique for seeking to improve cache storage utilisation.

20 Claims, 12 Drawing Sheets

U.S. PATENT DOCUMENTS

2003/0217230 A1  11/2003  Rodriguez et al.

FOREIGN PATENT DOCUMENTS

WO  99/50752  10/1999

OTHER PUBLICATIONS

Written Opinion for PCT/GB2006/003461 mailed Jun. 12, 2007.

International Preliminary Report on Patentability for PCT/GB2006/003461 completed Apr. 28, 2008.

Wang et al., "Using the compiler to improve cache replacement decisions", *Parallel Architectures and Compilation Techniques*, Sep. 2002, pp. 199-208, XP010619816.

Baer et al., "An Effective On-Chip Preloading Scheme to Reduce Data Access Penalty", *Proceedings of the Supercomputing Conference*, Nov. 1991, vol. conf. 4, pp. 176-186, XP000337480.

* cited by examiner

CACHE MANAGEMENT WITHIN A DATA PROCESSING APPARATUS

This application is the U.S. national phase of International Application No. PCT/GB2006/003461 filed 18 Sep. 2006 which designated the U.S. and claims priority to British Patent Application No. 0603552.1 filed 22 Feb. 2006, the entire contents of each of which are hereby incorporated by reference.

FIELD OF THE INVENTION

The present invention relates to techniques for managing a cache within a data processing apparatus.

BACKGROUND OF THE INVENTION

A cache may be arranged to store data and/or instructions fetched from a memory so that they are subsequently readily accessible by a device having access to that cache, for example a processing unit with which the cache may be associated. Hereafter, the term "data value" will be used to refer generically to either instructions or data, unless it is clear from the context that only a single variant (i.e. instructions or data) is being referred to. However, it is envisaged that the techniques of embodiments of the present invention will find more general applicability when used in association with data rather than instructions.

A cache typically has a plurality of cache lines, with each cache line being able to store typically a plurality of data values. When a processing unit wishes to have access (either read or write) to a data value which is not stored in the cache (referred to as a cache miss), then this typically results in a linefill process, during which a cache line's worth of data values is stored in the cache, that cache line including the data value to be accessed. Often it is necessary as an initial part of the linefill process to evict a cache line's worth of data values from the cache to make room for the new cache line of data. Should a data value in the cache line being evicted have been altered, then it is usual to ensure that the altered data value is re-written to memory, either at the time the data value is altered, or as part of the above-mentioned eviction process.

Each cache line typically has a valid flag associated therewith, and when a cache line is evicted from the cache, it is then marked as invalid. Further, when evicting a cache line, it is normal to assess whether that cache line is "clean" (i.e. whether the data values therein are already stored in memory, in which case the line is clean, or whether one or more of those data values is more up to date than the value stored in memory, in which case that cache line is not clean, also referred to as dirty). If the cache line is dirty, then on eviction that cache line will be cleaned, during which process at least any data values in the cache line that are more up to date than the corresponding values in memory will be re-written to memory. Typically the entire cache line is written back to memory.

In addition to cleaning and/or invalidating cache lines in a cache during a standard eviction process resulting from a cache miss, there are other scenarios where is it generally useful to be able to clean and/or invalidate a line from a cache in order to ensure correct behaviour; often software accessible cache maintenance operations are added to provide this capability. For example, such a process may be used during software managed inter-processor cache coherency (i.e. where no cache coherency hardware is available), which serves to ensure that in a system where there are multiple processors, each having access to their own caches, then each cache stores the most up-to-date version of a data value. If one processor updates the data value in its associated cache, and if another cache is already storing a copy of that data value, then the cache coherency technique may be used to either invalidate that copy, given that it is now out of date, or to cause that copy to be updated to reflect the most up-to-date value. Another situation where it is useful to be able to clean and/or invalidate a cache line from a cache in order to ensure correct behaviour is where page table descriptors are changed, which will typically result in the contents of a cache being flushed to memory with each data value being cleaned as required. A further example is when employing power management techniques, for example where a processor is about to enter a low power mode, and any data in its associated cache must be saved to another level in the memory hierarchy given that that cache will lose its data when entering the low power mode.

From the above discussions, it will be appreciated that it is common to provide cache maintenance operations to allow the cleaning and/or invalidation of lines from a cache as and when required to ensure correct operation of the cache. Often these cache maintenance operations are provided as privileged operations accessible only from supervisor (OS) code. This is particularly the case with operations that could have adverse side effects, for example invalidating a cache line without cleaning it can cause inconsistency if not handled very carefully.

The aforementioned cache maintenance operations generally instigate the requested management on the cache line immediately. If a large block of memory affecting a number of cache lines is being processed, then this can result in a significant amount of memory traffic, likely causing the associated processing unit's pipeline to back up or stall in the process.

In addition to using cleaning and/or invalidating processes to ensure correct behaviour, it would be desirable to be able to also use such processes to improve overall performance of a data processing apparatus by ensuring better cache utilisation. However, the above two aspects of conventional techniques, namely the privileged access and the immediacy of effect, result in conventional cache maintenance operations being less than ideal for such purposes.

The article "Using the Compiler to Improve Cache Replacement Decisions" by Z. Wang et al, Proceedings of the 2002 International Conference on Parallel Architectures and Compilation Techniques (PACT 02), describes a compiler mechanism that guides cache replacements by selectively predicting when data will or will not be reused, with the aim of improving replacement decisions in set-associative caches, thereby improving memory system performance. In accordance with the implementation described, a single tag bit called the evict-me bit is provided per cache line, and then in the instruction set architecture a new set of memory instructions are provided which set the evict-me tags and are otherwise the same as an original set of memory instructions. The embodiment uses five extra bits in each memory instruction that the compiler sets to resolve run time spatial locality. An alternative hardware implementation uses a new instruction to store the five-bit constant into a special register, and the following memory operations then access the special register and constant to detect spatial reuse, and then set the relevant evict-me bit accordingly.

The article "Cooperative Caching with Keep-Me and Evict-Me" by J. B. Sartor et al, The Ninth Annual Workshop on Interactions between Compilers and Computer Architectures, San Francisco, Calif., February 2005, discusses a cooperative caching technique that seeks to improve memory system performance by using compiler locality hints to assist hardware cache decisions. In accordance with this technique, the compiler suggests cache lines to keep or evict in set-associative caches. A compiler analysis predicts data that will be and will not be reused, and annotates the corresponding memory operations with a keep-me or evict-me hint. The architecture maintains these hints on a cache line and only acts on them on a cache miss. In particular, this paper discusses a keep-me caching policy, which retains keep-me lines if possible. Otherwise the default replacement algorithm evicts the least-recently-used (LRU) line in the set. The paper describes the use of a keep-me hint, the associated compiler analysis, and architectural support. The paper also discusses the use of special keep-me and evict-me instructions with additional bits for spatial, temporal, and counter tags.

Both of the above papers hence describe techniques where compiler analysis is used to predict data that will be or will not be reused, with modified instructions then being used to set the required keep-me or evict-me bits associated with cache lines, which can then be referenced when seeking to select a candidate cache line for eviction.

Whilst the above-described techniques can achieve better utilisation of available cache storage by preferentially evicting data perceived to be of less importance, the techniques require compiler analysis and use of particular instructions within the code to provide the required keep-me and evict-me hints. It would be desirable to provide a more automated technique for achieving better utilisation of available cache storage, which would not require any modification to the program code.

SUMMARY OF THE INVENTION

Viewed from a first aspect, the present invention provides a data processing apparatus comprising: at least one processing unit operable to execute a sequence of instructions; each of the at least one processing units having a cache associated therewith, each cache having a plurality of cache lines operable to store data values for access by the associated processing unit when executing the sequence of instructions; identification logic operable for each cache to monitor data traffic within the data processing apparatus and based thereon to generate a preferred for eviction identification identifying one or more of the data values as preferred for eviction; and cache maintenance logic operable for each cache to implement a cache maintenance operation during which selection of one or more data values for eviction from that cache is performed having regard to any preferred for eviction identification generated by the identification logic for data values stored in that cache.

In accordance with the present invention, a data processing apparatus is provided with identification logic which, for a cache associated with a processing unit, monitors data traffic within the data processing apparatus and based thereon generates a preferred for eviction identification identifying one or more of the data values in that cache as preferred for eviction. Cache maintenance logic is then able when selecting one or more data values for eviction from a cache to take into account any preferred for eviction identification generated by the identification logic for data values stored in that cache.

Hence, in contrast to the above-described prior art approach, where compiler analysis was used to identify likely reuse and then, modify the sequence of instructions to include explicit keep-me or evict-me hints, the present invention makes no such modification to the sequence of instructions, but instead provides identification logic within the data processing apparatus to monitor data traffic and to generate preferred for eviction identifications based on that monitored data traffic. This provides a great deal of flexibility with regards to generation of preferred for eviction identifications, and increases the variety of situations in which better cache storage utilisation can be achieved through use of preferred for eviction identifications. The technique of the present invention can be applied to all types of code executing on the data processing apparatus, and does not require the overhead of performing compiler analysis, and the insertion of explicit hints into the instructions executed, thereby offering compatibility with existing code.

The preferred for eviction identifications produced by the identification logic of the present invention provide hints used by the cache maintenance logic when deciding which data values to evict from the cache. Since the preferred for eviction identifications are used only as hints, they do not cause any bypassing of the correct sequence of operations that the cache needs to take when evicting a line of data values. Therefore, a cache line indicated as preferred for eviction will undergo all of the normal coherency, cleaning and other related housekeeping operations that a cache line will go through before being evicted from the cache.

In one embodiment, the data processing apparatus further comprises identification retention logic operable for each cache to retain one or more preferred for eviction identifications generated by the identification logic for data values stored in that cache, for reference by the cache maintenance logic. The use of such identification retention logic assists in decoupling the operation of the identification logic from the operation of the cache maintenance logic so that the identification logic can operate in isolation from the cache maintenance logic to provide preferred for eviction identifications as and when appropriate having regards to the data traffic being monitored by the identification logic. The cache maintenance logic can then refer to the preferred for eviction identifications stored by the identification retention logic when required during its cache maintenance operations. The identification retention logic can take a variety of forms, and hence for example may be distributed within the existing cache structure, for example within the tag portion of the cache memory, or may be provided as a discrete block or subsystem, either within or external to the cache.

The manner in which the identification logic monitors data traffic can take a variety of forms. In one embodiment, the identification logic comprises transient data detection logic operable for each cache to detect when execution of the sequence of instructions by the associated processing unit is causing data values to be accessed which are of transient interest to the associated processing unit, the transient data detection logic being further operable to identify such data values of transient interest stored in that cache as preferred for eviction. In accordance with such an approach, data detected to be of transient interest is preferentially marked for eviction, with the cache maintenance logic then taking that marking into account when deciding on candidate cache lines for eviction, this resulting in more effective use of the available cache resource.

In one particular embodiment, the transient data detection logic comprises streaming detection logic, and the data values of transient interest are a stream of data values. In accordance with this embodiment, the identification logic attempts to detect when a program is accessing data in a streaming fashion. In one embodiment, the heuristic used is to spot a regular pattern of load or store traffic. This could be done by observing the data address stream, or it could be done by monitoring the program counter (PC) of load/store instructions and spotting when the PC of a load/store instruction is observed repeatedly, indicating that the instruction is in a loop. The streaming nature of such a code sequence often results in data being referred to intensely for a brief period of time, before the focus moves on to newer data in the stream. Once a stream has been detected, the identification logic can indicate that line fills associated with data in that stream should be marked as preferred for eviction.

In one embodiment, the data processing apparatus further comprises prefetch logic operable for each cache to prefetch data values from memory for storing in that cache in anticipation of those data values being required to be accessed by the associated processing unit, the prefetch logic comprising said identification logic such that prefetched data values of transient interest are identified as preferred for eviction. In accordance with this embodiment, when detecting data values of transient interest, prefetch logic can then be deployed to seek to fetch data values ahead of the program's requirements, thus increasing the likelihood of the data being in the cache by the time the program requests it. Such data fetched into the cache by the prefetch logic is speculative in nature since the program has not explicitly asked for it at that time. Hence, it is possible that the prefetch logic may have fetched past the end of the data that the program is actually interested in, or may have incorrectly gauged any pattern in the data values of transient interest, for example a streaming pattern, and as a result brought erroneous data into the cache. Accordingly, in such an embodiment of the present invention, whilst the prefetch logic can produce additional speed benefits by prefetching the data, the prefetched data values are identified as preferred for eviction, thereby reducing the time that prefetched data stays resident in the cache.

In one embodiment, at least one of the caches employs a write allocate policy, such that if a write data value output by the associated processing unit during a write operation results in a cache miss, a selected cache line in that cache is subjected to a linefill process. The write data will then be merged with the fetched cache line. This process can be optimised if a burst of write requests can be detected that will write to the entire cache line, since in those circumstances it is unnecessary to fetch the line from external memory first prior to merging in the write data associated with the burst of write requests. Instead, a line can be selected for use within the cache, and the entire line written with the write data from the burst of write requests. Code sequences that are likely to perform bursts of writes across entire cache lines include memory zeroing and memory copying operations. If the block of memory being zeroed or copied is large, the write allocation policy can result in a significant perturbation of cache contents in a write allocate cache.

In accordance with an embodiment of the present invention, the identification logic comprises burst write detection logic operable to detect a situation where a series of write operations are issuing a plurality of write data values sufficient to fill a number of selected cache lines above a threshold value and to identify as preferred for eviction the data values of at least the selected cache lines subsequent to detection of the threshold value being exceeded. It is often the case for a series of write operations relating to a large block of memory (also referred to herein as a block write operation) that the block of memory in question may not be referred to again for some time, and hence it would be preferable that the block write operation does not pollute the cache excessively with this data. By use of the above technique of an embodiment of the present invention, this is achieved by marking certain of the selected cache lines associated with a block write operation exceeding a particular size as preferred for eviction. Such an approach increases the likelihood that a large block write operation will evict lines that were established in the cache earlier on by the same block write operation, instead of other cache data, thereby reducing the perturbation of cache contents that may otherwise arise. In addition to reducing the perturbation in the cache, this scheme will also make it more likely that write data will drain from the cache over time, since such lines will be marked as preferred for eviction. This will have a tendency to reduce the number of dirty lines in the cache over time and reduce the amount of time that the CPU has to spend cleaning/invalidating if the software needs to ensure that a lower level of memory has received the write data.

In one embodiment of present invention, the at least one processing unit comprises a plurality of processing units, and the data processing apparatus further comprises: cache coherency logic operable to manage coherency between each of the caches associated with the plurality of processing units; for each cache, in the event of a cache miss occurring an allocated cache line being subjected to a linefill process; if the cache coherency logic determines that the linefill process can be serviced by data values stored in an identified cache line of one of the other caches, then the data values being loaded into the allocated cache line from that identified cache line of said other cache, and the identification logic being operable to identify the data values of at least one of that allocated cache line and said identified cache line as preferred for eviction. In one such embodiment, the data processing apparatus is a Chip Multi-Processor (CMP) system having multiple processing units (e.g. CPUs) with private cache resources that are kept coherent using a hardware cache coherency scheme. The cache coherency logic allows a first cache's linefill request to be satisfied by a second cache in the CMP system associated with a different processing unit, if that second cache happens to hold a duplicate copy of the required data values. This improves the cache linefill latency, since it is typically quicker to retrieve the data from the second cache than instead seeking to access the data from bulk memory.

Given that the obtaining of the data from the second cache is less expensive than obtaining it from bulk memory, in accordance with this embodiment of the present invention the identification logic is operable to identify the data values of at least one of the allocated cache line and the identified cache line as preferred for eviction, since if such a line is evicted by other data it is comparatively cheap to recover that data later. Such a policy will tend to retain cache lines for which there is not a duplicate copy in one of the other caches associated with one of the other processing units, thereby reducing overall linefill times.

In one embodiment of the present invention, the at least one processing unit comprises a plurality of processing units, and the data processing apparatus further comprises: cache coherency logic operable to manage coherency between each of the caches associated with the plurality of processing units; for a particular block of memory addresses, the cache coherency logic being operable to dynamically grant one processing unit ownership for writing data values associated with that block of memory addresses, with the other processing units being allowed only to store those data values within their associated cache for read access; when said one processing unit updates a data value associated with that block of memory addresses, said one processing unit being operable to broadcast the updated data value via the cache coherency logic to any caches associated with the other processing units that are storing a copy of that data value for read access, so as to cause said caches to update their copy of that data value; the identification logic being operable for those caches receiving the updated data value via the cache coherency logic to cause a cache line containing a copy of that data value for read access to be identified as preferred for eviction.

In accordance with this embodiment, one processing unit negotiates ownership for writing to a block of memory and a number of other processing units may cache the same block for read only purposes. When the owning processing unit writes to the cache line, that processing unit notifies the other sharing processing units of the update so that they can update their local copies. Such a technique is known as a write update scheme. Write update schemes minimise the latency between a producer task updating a data value and a consumer task being able to read it. However, an adverse consequence of a write update scheme is increased bus and cache traffic, with corresponding impact on throughput and energy consumption, some of which can be unnecessary if some processing units are no longer active consumers of the data being updated.

In accordance with the above described embodiment of the present invention, the preferred for eviction notification is used such that write updates cause the relevant cache line to be marked as preferred for eviction in the caches associated with processing units having read only access. If a processing unit is no longer actively interested in the data in such a cache line of its associated cache, then it will not access that data, and on an eviction that cache line is likely to be chosen in preference to another cache line, thereby assisting in removing the presence of shared cache lines when they are no longer of interest.

In one embodiment, the data processing apparatus further comprises a logic unit operable to issue one or more data values to be read by one of said at least one processing units for storing in the cache associated with that processing unit; the identification logic being operable to identify those data values within that cache as preferred for eviction. An example of where such a process may be used is when a logic unit causes data to be stored in the cache associated with a particular processing unit as a mechanism for that data to be read by that processing unit (also referred to herein as a "write push" mechanism). In accordance with the write push scheme, an external agent can cause a line to be established in the processing unit's cache, in effect the agent "pushing" the line into the cache from outside. One reason for wanting to do this is if an external agent wants to send a message to a particular processing unit. The message is typically written into memory and a signal sent to the processing unit (for example in the form of an interrupt). The processing unit then executes a software routine that reads the message, causing the message data to be linefilled into its cache. By pushing the message into the processing unit's cache, the linefill latency at the handler routine can be avoided.

In accordance with the above embodiment of the present invention, such data values pushed into the cache are marked as preferred for eviction. It is quite likely that the processing unit will only need to refer to the contents of the message for a brief period of time, and therefore by marking the data values associated with such a write push mechanism as preferred for eviction, this will make those data values more likely to be evicted.

The logic unit issuing the one or more data values for storing in the cache associated with the processing unit can take a variety of forms. It may for example be a direct memory access (DMA) engine, or any other master device within the data processing apparatus able to issue data values for reading by the processing unit. However, in one embodiment, the at least one processing unit comprises a plurality of processing units, and the logic unit is one of the plurality of processing units. Hence, in this example, one processing unit is able to issue data values to be stored in the cache associated with the other processing unit, with the identification logic then causing those data values to be marked as preferred for eviction.

In one embodiment, the at least one processing unit comprises a plurality of processing units, and a memory hierarchy exists within the data processing apparatus having a number of memory levels, each of the caches associated with the plurality of processing units being provided at one memory level, and when processing access requests issued by the processing units memory levels higher in the hierarchy being accessed before memory levels lower in the hierarchy. The data processing apparatus of such an embodiment further comprises cache coherency logic operable to manage coherency between each of the caches associated with the plurality of processing units. When the data values of a cache line are to be evicted from one of said caches at said one memory level, the cache coherency logic is operable to determine whether to cause that cache line to be evicted to a lower memory level of the memory hierarchy or if instead to cause one of the other caches at said one memory level to act as a recipient cache, and if the cache coherency logic determines that one of the other caches at said one memory level is to act as the recipient cache, the data values of the evicted cache line are caused to be stored within a cache line of the recipient cache and the identification logic is operable to identify that cache line in the recipient cache as preferred for eviction.

In accordance with this embodiment of the present invention, the cost of evicting data values to a lower memory level in the hierarchy is sought to be reduced by instead placing an evicted cache line in another cache at the same memory level as the cache from which it is evicted, even though such a cache is not naturally in the evicting processing unit's "line of sight" (i.e. the recipient cache is one which the processing unit would not naturally allocate into). Whilst such an approach can reduce the energy and performance costs that might otherwise occur if the cache line were instead evicted to a lower memory level, there is a trade off in terms of the impact that this eviction caching technique has on the processing unit associated with the recipient cache to which the evicted line gets allocated. In accordance with the above embodiment of the present invention, when the data values of the evicted cache line are stored within a cache line of the recipient cache, that cache line in the recipient cache is marked as preferred for eviction. This helps to reduce the impact that that cache line in the recipient cache has on the processing unit with which that recipient cache is associated, since in a subsequent eviction process, that cache line will be evicted in preference to another cache line that has not been marked as preferred for eviction. Hence, by such an approach, the energy and performance benefits of moving the evicted cache line to another recipient cache at the same memory level rather than storing it to a lower memory level of the hierarchy can be achieved, but without unduly impacting the processing unit with which the recipient cache is associated.

The preferred for eviction identifications issued by the identification logic can be retained within the cache in a variety of ways. In one embodiment, for at least one cache associated with said at least one processing unit each cache line has associated therewith a preferred for eviction field which is set in dependence on the preferred for eviction identification produced by the identification logic. This hence enables a separate indication to be retained for each cache line, thus providing a fine level of granularity of preferred for eviction information to the cache maintenance logic.

In an alternative embodiment, for at least one cache associated with said at least one processing unit, that cache is an n-way set associative cache, each set having a preferred for eviction pointer which is settable in dependence on the preferred for eviction identification produced by the identification logic to enable at least one cache line per set to be marked as preferred for eviction. In one particular embodiment, one cache line per set can be marked as preferred for eviction. Such an approach hence reduces the storage requirements within the cache for holding preferred for eviction information for use by the cache maintenance logic whilst still enabling at least one cache line per set to be marked as preferred for eviction.

In one embodiment, for at least one cache associated with said at least one processing unit said identification retention logic comprises a FIFO structure. By such an approach, the identification retention logic acts as a buffer for temporarily storing the preferred for eviction identifications issued by the identification logic. As each preferred for eviction identification reaches the head of the FIFO, it can then be routed to the cache maintenance logic. In one particular embodiment, this may cause the cache maintenance logic to evict the cache line identified by the preferred for eviction identification output from the FIFO structure, typically as a background activity.

In one embodiment, for at least one cache associated with said at least one processing unit said identification retention logic comprises a lookup structure containing an indication of cache lines identified by preferred for eviction identifications issued by the identification logic, and said cache maintenance operation is implemented by the cache maintenance logic during a linefill operation, the cache maintenance logic being operable to reference the lookup structure in order to seek to detect a candidate cache line for eviction.

The lookup structure will be of a finite size, and accordingly there will be a limit to the volume of preferred for eviction identifications that can be retained within the lookup structure. At the time the cache maintenance operation is implemented by the cache maintenance logic, the current contents of the lookup structure can be referenced by the cache maintenance logic in order to seek to select a candidate cache line for eviction. Hence, considering the set associative cache example, when a cache line from a particular set needs to be evicted, the cache maintenance logic can determine from the lookup structure whether any of the cache lines in the relevant set have been recorded as being preferred for eviction, and if so to evict one of those cache lines in preference to any other cache line in the set that is not marked as preferred for eviction.

The lookup structure can take a variety of forms. In one embodiment, the lookup structure is an associative search FIFO structure. As new preferred for eviction indications are received by such a FIFO structure, they will overwrite the preferred for eviction indications at the head of the FIFO. In an alternative embodiment, the lookup structure is an associative search cache structure.

In one embodiment, for at least one cache associated with said at least one processing unit the cache maintenance logic is provided by a cache controller used to reference the preferred for eviction identification when selecting a victim cache line for eviction from that cache as part of a linefill process.

In one particular embodiment, the at least one cache is an n-way set associative cache, and for said at least one cache each cache line has associated therewith a preferred for eviction field which is set in dependence on the preferred for eviction identification produced by the identification logic, the identification logic being provided by the cache controller. In the event of a cache hit occurring in a cache line of that cache the identification logic is operable to cause the preferred for eviction field associated with that cache line to be cleared, whilst in the event of a cache miss occurring in a cache line of that cache an allocated cache line is subjected to a linefill process, and the identification logic is operable to cause the preferred for eviction field associated with that allocated cache line to be cleared. If the clearing of the preferred for eviction field associated with the allocated cache line will result in no cache lines in the set containing the allocated cache line having preferred for eviction fields which are set, then the identification logic is further arranged, for that set, to cause the preferred for eviction fields associated with all cache lines in that set other than the allocated cache line to be set.

By providing a preferred for eviction field associated with each cache line, and then setting and clearing the preferred for eviction fields as discussed above, a modified Most Recently Used (MRU) cache replacement policy can be implemented. This modified scheme preferentially evicts lines marked as preferred for eviction and has a longer time base than the prior art MRU scheme, which could erroneously evict lines recently fetched into the cache when lines not accessed for a long time are still resident in the cache.

In one embodiment, the cache maintenance logic comprises background cache maintenance logic. Instead of merely evicting cache lines in the event of a cache miss, the background cache maintenance operation can instead work autonomously using the preferred for eviction information in order to evict cache lines that have been marked as preferred for eviction. This may involve merely invalidating the relevant line if its contents are clean, or in the event that the contents are dirty, this may involve the storing of the cache line back to a lower memory level, followed by invalidation of the cache line.

In one embodiment, a memory hierarchy exists within the data processing apparatus having a number of memory levels, for each cache associated with said at least one processing unit that cache being provided at one memory level, and when processing access requests issued by the processing units memory levels higher in the hierarchy being accessed before memory levels lower in the hierarchy. The data processing apparatus further comprises: an additional cache provided at another memory level lower than said one memory level, said additional cache having additional identification logic associated therewith for identifying one or more of the data values stored in the additional cache as preferred for eviction. When a data value is promoted from the additional cache for storage in a cache at said one memory level as part of a linefill process of the cache, the additional identification logic is operable to identify that data value as stored within the additional cache as preferred for eviction.

By such an approach, the data value that is promoted from the additional cache for storage in a cache at a higher memory level is marked as preferred for eviction within the additional cache, so that it is victimised ahead of other valid lines. As a result, when it is subsequently necessary to allocate a cache line within the additional cache, a cache line marked as preferred for eviction will be chosen in preference to a valid line not so marked. This has the result that the cache at the higher memory level and additional cache at the lower memory level tend towards operating in an exclusive manner, since data promoted from the additional cache into the cache at the higher memory level will tend to be evicted from the additional cache in due course. Accordingly, the storage saving benefits of adopting an exclusive caching policy tend to be achieved, but without encountering some of the drawbacks of classic exclusive caching schemes, for example avoiding the need to remove a cache line from the lower memory level when it is promoted to the higher memory level.

In the embodiments described above having multiple processing units, each with their associated cache, the identification logic, cache maintenance logic and identification retention logic will typically be provided separately in association with each cache, but may alternatively in principle be shared amongst the caches.

Viewed from a second aspect, the present invention provides a method of managing at least one cache within a data processing apparatus having at least one processing unit for executing a sequence of instructions, each of the at least one processing units having a cache associated therewith, each cache having a plurality of cache lines for storing data values for access by the associated processing unit when executing the sequence of instructions, the method comprising the steps of: (a) for each cache, monitoring data traffic within the data processing apparatus and based thereon generating a preferred for eviction identification identifying one or more of the data values as preferred for eviction; and (b) for each cache, implementing a cache maintenance operation during which selection of one or more data values for eviction from that cache is performed having regard to any preferred for eviction identification generated at said step (a) for data values stored in that cache.

It will be appreciated from the above discussions that a number of distinct and separate embodiments of the present invention are possible. One or more of these separate embodiments may be combined within any example implementation where appropriate. As an example, in a CMP system, identification logic could be provided to generate preferred for eviction identifications when any one of the above described situations occur, for example when a linefill process is serviced by data values stored in another cache at the same level in the memory hierarchy, when copies of data values are retained in certain caches for read access by their associated processing units and are then updated as a result of a broadcast update from another processing unit, when evicting a cache line to a recipient cache at the same memory level in the memory hierarchy, etc. Additionally, separate identification logic may be provided in association with each processing unit to detect transient data and generate associated preferred for eviction identifications.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
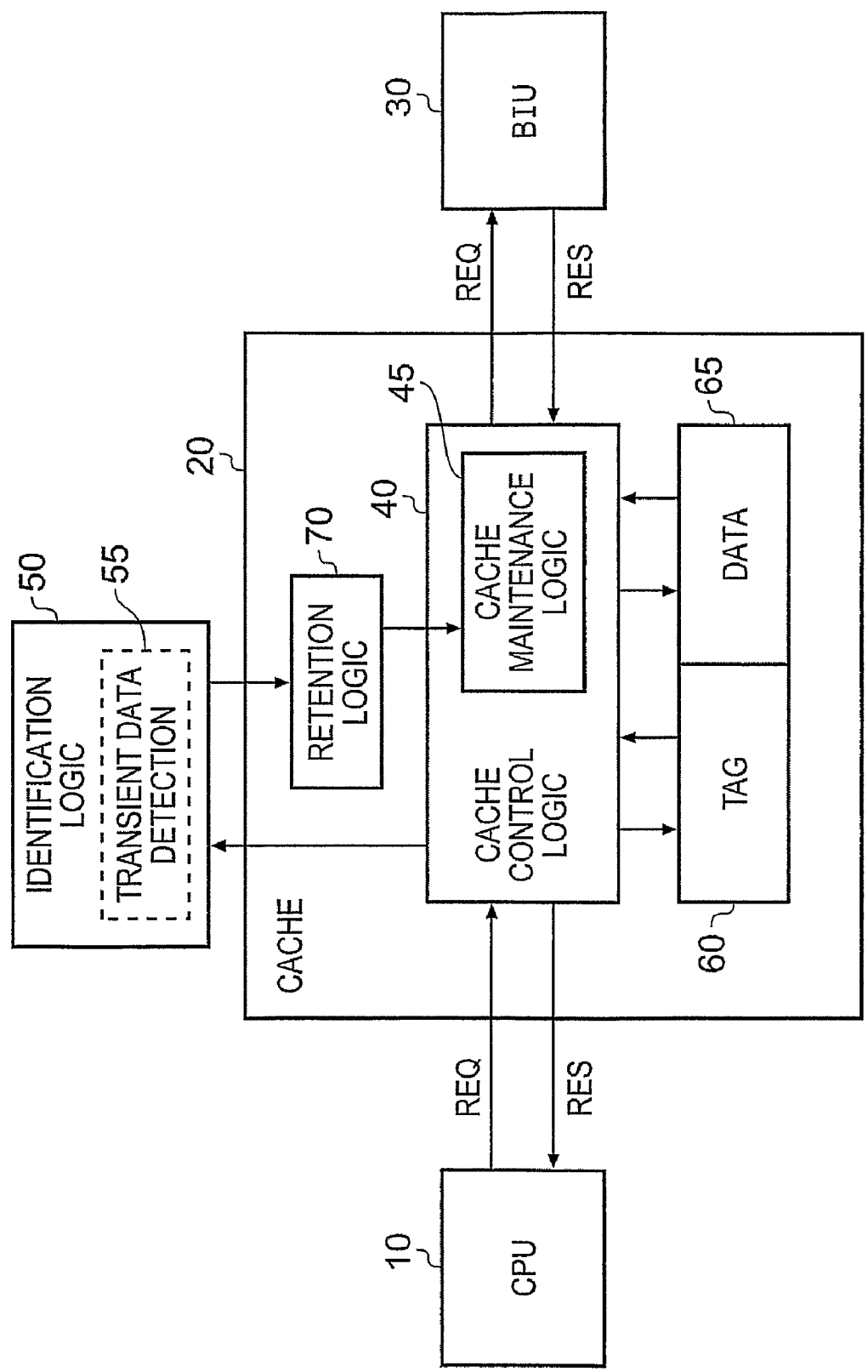
FIG. 1 is a block diagram of a data processing apparatus in accordance with one embodiment of the present invention.

FIG. 1 is a block diagram of a data processing apparatus in accordance with a first embodiment of the present invention. This first embodiment is a uni-processor embodiment in which a single CPU 10 has an associated cache 20 operable for storing data values for access by the CPU 10. When the CPU 10 wishes to access a data value, it issues an access request to the cache control logic 40. For a write access, this access request will also be accompanied by a write data value. The cache control logic 40 will then perform a lookup in the tag portion 60 of the cache 20 in order to determine whether a tag portion of the address specified in the access request matches a tag value stored in the tag portion 60 of the cache. If so, the corresponding data value is accessed in the data portion 65 of the cache 20. In the event of a write operation, this will cause the write data value to be stored in the relevant cache line of the data portion 65 with an acknowledgement signal being issued over the result path from the cache control logic 40 to the CPU 10 to confirm that the write update has taken place. Similarly, for a read operation, the relevant data value will be read from the appropriate cache line of the data portion 65 and returned over the result path from the cache control logic 40 to the CPU 10.

Cache maintenance logic 45 is provided within the cache control logic 40 for performing cache maintenance operations during which it will typically be necessary to identify one or more cache lines for eviction from the cache 20. Whilst in some instances these cache maintenance operations may be required merely to ensure correct behaviour of the cache, in accordance with an embodiment of the present invention the cache maintenance logic 45 is also arranged to perform cache maintenance operations in order to seek to ensure better utilisation of available cache storage by preferentially evicting data perceived to be of less importance. In achieving this goal, the cache maintenance logic 45 has access to retention logic 70 which is arranged to store one or more preferred for eviction (PFE) indications generated by identification logic 50 associated with the cache 20.

The identification logic 50 is arranged to monitor data traffic within the data processing apparatus, and in this embodiment is arranged particularly to monitor the activities of the cache control logic 40 (for example each explicit cache access or each linefill event) and hence monitor the data traffic associated with memory access requests issued by the CPU 10. The type of activities that the identification logic 50 looks for in order to generate PFE identifications can take a variety of forms. In one embodiment, the identification logic 50 contains transient data detection logic 55 which seeks to detect when execution of a sequence of instructions by the CPU 10 is causing data values to be accessed which are of transient interest to the CPU 10. In particular, in one embodiment, the transient detection data logic 55 attempts to detect when a program executing on the CPU 10 is accessing data in a streaming fashion. In one embodiment, the heuristic used by the transient data detection logic 55 to achieve such detection involves spotting a regular pattern of load or store traffic processed by the cache control logic 40. This can be achieved by observing the data address stream specified by the various memory access requests issued by the CPU 10, or by monitoring the program counter (PC) of load/store instructions and spotting when the PC of a load/store instruction is observed repeatedly, indicating that the instruction is in a loop. Once a stream has been detected by the transient data detection logic 55, the identification logic 50 can issue preferred for eviction indications to the retention logic 70, these preferred for eviction indications being associated with any linefills associated with data in the identified stream.

When a cache miss occurs within the cache 20, i.e. a memory access request identifies a data value that is not currently contained within the cache, then the cache maintenance logic 45 will initiate a linefill process, whereby a request is propagated from the cache control logic 40 via the bus interface unit (BIU) 30 to a further memory level in the memory hierarchy, for example a level 2 cache, bulk memory, etc, in order to retrieve into the cache 20 a cache line's worth of data values including the data value at the address that caused the cache miss to occur. This cache line's worth of data values will be returned to the cache control logic 40 over the result path from the BIU 30 for storing in the cache 20. To make room for this new cache line of data, the cache maintenance logic 45 will typically have to evict an existing cache line from the cache. For a set associative cache, the relevant set portion of the address specified by the memory access request will identify a set of cache lines including one cache line from each way which can be used for storing the new cache line retrieved by the linefill process. In one embodiment, the cache maintenance logic 45 will review the cache lines in the set to see if any are invalid, and if so will choose an invalid cache line as the cache line in which to store the linefill data. However, assuming there are no invalid cache lines, then in accordance with embodiments of the present invention the cache maintenance logic 45 will review the PFE indications in the retention logic 70 to see if any of the cache lines in the set have been marked as preferred for eviction. If so, the cache maintenance logic 45 will choose one such cache line to be evicted from the cache to make room for the linefill data. If that cache line to be evicted is valid and clean, then it merely needs to be marked as invalid or be overwritten. However, if the line is dirty, i.e. at least one of the data values in that cache line is more up-to-date than the corresponding data value(s) as stored in a lower level of the memory hierarchy, then on eviction that cache line will be cleaned, during which process any such data values which are more up-to-date than the corresponding values in the lower level of memory will be re-written to that lower level of memory.

Since the streaming data resulting from a regular pattern of load or store traffic is often referred to intensely for a brief period of time, before focus then moves on to newer data in the stream, such data is typically only of transient interest, and by using the identification logic 50 to mark such data as preferred for eviction as it is linefilled into the cache, this will ensure that in a subsequent eviction process, such a cache line will be chosen in preference to another cache line holding data other than such streamed data, i.e. such streamed data will be given preferential status for eviction.

In an alternative embodiment, if the cache 20 employs a write allocate policy, then the transient data detection logic 55 can take the form of burst write detection logic seeking to detect a situation where a series of write operations are issuing a plurality of write data values sufficient to fill a number of allocated cache lines above a threshold value, i.e. to detect a block write operation to a block of memory exceeding a particular size. Examples of such block write operations would be memory zeroing and memory copying operations. It is often the case that the block of memory referred to by such block write operations may not be referred to again for some time, and hence it is preferable that the block write operation does not pollute the cache excessively with this data. In accordance with this embodiment of the present invention, the block write detection logic 55 identifies such block write operations, as a result of which the identification logic 50 issues PFE indications to the retention logic 70 to identify data values stored in the allocated cache lines of the cache 20 associated with the block write operation as preferred for eviction. Such an approach increases the likelihood that a large block write operation will evict lines that were established in the cache 20 earlier on by the same block write operation, instead of other cache data, thereby reducing the perturbation of cache contents that may otherwise arise.

In such embodiments, the burst write detection logic 55 could take a number of forms. A simple implementation may monitor the rate of "allocate line without reading from memory" operations and trigger if this rate exceeds a threshold value. Subsequent burst writes to an entire cache line would then be allocated into the cache with the PFE designation indicated. The detection logic 55 would continue to monitor the rate of "allocate line without reading from memory" operations, and return to the idle state if the rate falls below the threshold value. With the detection logic returned to the idle state, subsequent burst write allocations will not have the PFE designation indicated by identification logic 50.

An alternative embodiment of the burst write detection logic 55 may monitor block addresses of burst writes in order to more accurately determine that a series of burst writes are related. A yet further embodiment may monitor the PC of burst store operations, for instance a block write operation (STM): The burst write detection logic 55 would then record the PC of block write operations previously encountered, and use this to detect when a particular operation is being executed repeatedly (i.e. in a loop). The detection of a block write operation inside a loop is a reasonable indication of a block memory operation, and the detection logic 55 could then determine that the PFE designation should be indicated by the identification logic 50 for line allocations caused by such a block write operation.

Figure 2:
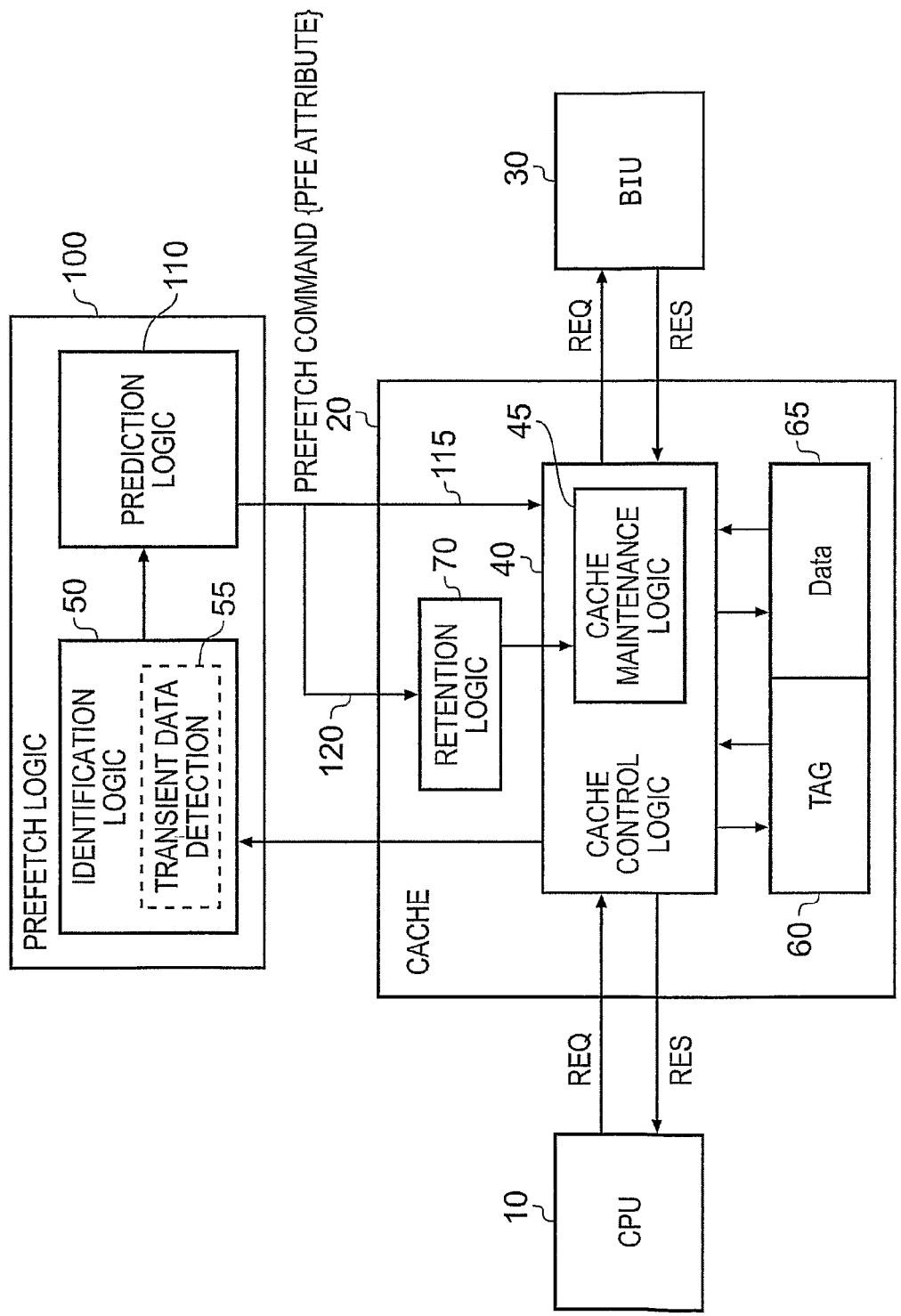
FIG. 2 is a block diagram of a data processing apparatus in accordance with another embodiment of the present invention.

FIG. 2 is a block diagram of an alternative embodiment of the data processing apparatus. As will be appreciated from the comparison of FIG. 2 with FIG. 1, the data processing apparatus of FIG. 2 is similar to that of FIG. 1, but in this instance the identification logic 50 is contained within prefetch logic 100. The prefetch logic 100 includes prediction logic 110 for predicting data values that will subsequently be required by the CPU 10, and for those data values then issuing a prefetch command over path 115 to the cache control logic 40 to cause a linefill operation to be invoked by the cache maintenance logic 45 to retrieve the required data into the cache 20 ahead of the time it is required by the CPU 10.

The particular embodiment illustrated in FIG. 2 builds on the streaming data identification detection process discussed earlier with reference to FIG. 1. Once the transient data detection logic 55 determines that a program is accessing data in a streaming fashion, the identification logic 50 is arranged to issue a preferred for eviction control signal to the prediction logic 110, which then causes the prediction logic 110 to issue one or more prefetch commands over path 115 to the cache control logic 40 to cause data to be fetched ahead of the program's requirements, thus increasing the likelihood of the data being in the cache by the time the program requests it. Additionally, the prediction logic 110 outputs a PFE attribute in association with the prefetch command, which is set for prefetch commands issued as a result of the control signal received from the identification logic 50. This set PFE attribute is routed over path 120 to the retention logic 70, from where it is referenced by the cache maintenance logic 45 when performing the associated linefill process, thereby causing data prefetched into the cache in this manner to be marked as preferred for eviction.

This is useful, since data fetched into the cache by the autonomous prefetch logic 100 is speculative in nature, since the program has not explicitly asked for that data yet. In particular, the prefetch logic may have fetched past the end of the data that the program is actually interested in, or the transient data detection logic 55 may have incorrectly gauged the streaming pattern as a result of which the prefetch logic 100 has caused erroneous data to be brought into the cache. There is benefit therefore in indicating such data speculatively fetched into the cache as preferred for eviction, to reduce the time that such prefetched data stays resident in the cache.

The transient data detection logic 55 of FIGS. 1 and 2 can be embodied in a variety of ways. In one embodiment, such logic can be based on a reference predictor table (RPT) such as that described in the article "An Effective On-Chip Preloading Scheme To Reduce Data Access Penalty" by Jean-Loup Baer and Tien-Fu Chen, Proceedings of Supercomputing '91 p 176-186, November 1991. Baer and Chen teach the use of a PRT that is useful in their prefetching scheme. The RPT described in section 3.3 of their article provides logic to determine whether a load has predictable streaming behaviour and could therefore be a target of their prefetching logic. The RPT combines two aspects:

a table storing information about loads
a prediction state machine determining whether a particular load is suitable for prefetching The table contains a tag in order to match against the load instruction's PC (program counter) value; a previous (data) address issued by the load instruction, a stride (increment from data address before that) and a state entry (updated by the predictor logic).

When a load is seen for the first time, an entry may be allocated in the RPT. When executed a subsequent time, the RPT can be referenced, and this loads entry located. The new prev_addr entry can be subtracted from the current load (data) address and this value placed in the stride entry; the new data address can be placed in the prev_addr field. When executed a third time, the value of prev_addr+stride can be compared with the new load (data) address and this drives the prediction logic in terms of whether the load is following a predictable pattern. If so, the prediction state machine settles into a steady state; otherwise the predictor settles into a no-pred state.

In their paper, Baer and Chen use the RPT to drive a speculative prefetch engine, using the prev_addr and stride information. In the above described embodiments of the present invention the RPT could be used for this purpose, but additionally/alternatively it could be used just to provide an indication that a particular load is moving through a predictable series of addresses. This could be taken by itself or in combination with other information that the memory access is transient in nature in order to produce an indication that the access could be marked as preferred for eviction.

Additional heuristics could be added to the transient detection determination; for instance a count entry could be placed in the RPT to allow the hardware to determine how many times the same address had been referenced between linefills. If below a threshold then the load could be marked as transient, if above then it may be beneficial to retain that line in the cache for longer.

Figure 3:
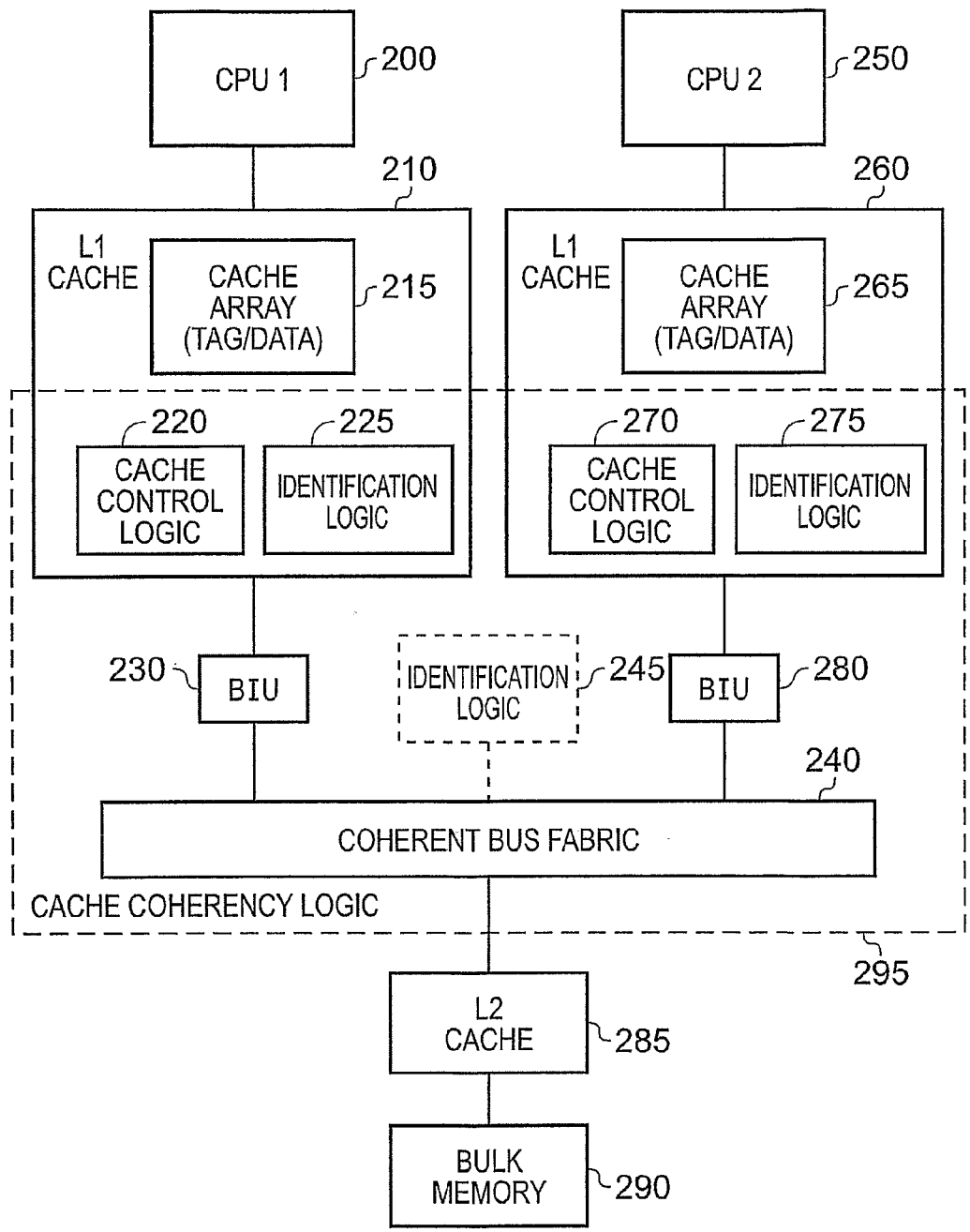
FIG. 3 is a block diagram of a data processing apparatus in accordance with an alternative embodiment of the present invention.

FIG. 3 is a block diagram of an alternative embodiment of the present invention. In accordance with this embodiment, a CMP system is provided having multiple CPUs. For the sake of illustration two CPUs 200, 250 are shown. Each CPU has an associated level one cache 210, 260, each cache having a cache array 215, 265 comprising tag and data portions, and associated cache control logic 220, 270. Identification logic 225, 275 is also provided in association with each level one cache 210, 260 to monitor data traffic passing through the associated cache, and based thereon to generate one or more PFE indications for use by the cache control logic when selecting cache lines for eviction.

Each CPU and associated level one cache is coupled via a BIU 230, 280 with a coherent bus fabric 240, via which the CPUs and associated level one caches are coupled to other memory levels in the memory hierarchy, for example a level two cache 285, bulk memory 290, etc. It will be appreciated that in some embodiments there is no requirements for a level two cache 285, and instead the bulk memory 290 may be coupled directly to the coherent bus fabric 240. The coherent bus fabric 240, along with the cache control logic 220, 270 associated with each level one cache 210, 260, collectively form cache coherency logic 295 used to manage coherency between each of the level one caches 210, 260. In some embodiments, the tag entries in the cache arrays 215, 265 could also be viewed as forming part of the cache coherency logic, for example if those entries hold some line state information relevant to cache coherency. Hence, by way of example of the operation of the cache coherency logic 295, if the cache 260 holds a copy of a data value which is also stored within the cache 210, and the CPU 200 updates its copy of that data value in the cache 210, then the cache coherency logic 295 will ensure that either the relevant cache line in the cache 260 is cleaned and invalidated, or alternatively the relevant data value in that cache 260 is updated accordingly, so that the CPU 250 will not access out-of-date data.

As schematically illustrated in FIG. 3, identification logic 245 can be provided coupled to the coherent bus fabric 240 in addition to, or as an alternative to, the identification logic 225, 275 provided in association with each level one cache 210, 260. The identification logic 245 would then monitor data traffic passing over the coherent bus fabric 240, and as a result thereof generate PFE indications for reference by the cache control logic 220, 270 of each level one cache 210, 260 when determining cache lines for eviction.

In accordance with one embodiment of the present invention, in the event of a cache miss occurring in one of the level one caches; for example the level one cache 210, a linefill request will be issued from the associated cache control logic 220, and will be output via the BTU 230 over the coherent bus fabric 240. If the cache coherency logic 295 determines that the linefill process can be serviced by data values stored in a cache line of the other level one cache, in this example the level one cache 260, then the linefill request will be routed via the coherent bus fabric 240 and the BIU 280 to the cache control logic 270 of the level one cache 260, rather than being routed to the level two cache 285. This will result in the cache line of data being returned from the level one cache 260 via the BTU 280, coherent bus fabric 240 and BIU 230, to the level one cache 210 for storing in the allocated cache line of the cache array 215. Such a technique is known as direct data intervention, and allows a first cache's linefill request to be satisfied by a second, private, cache in the CMP system if the second cache happens to hold a duplicate copy of the required cache line. Such an approach improves the cache linefill latency, as the time to retrieve data from a second on-chip cache is much less than the time taken to access bulk memory 290, or a level two cache 285 (the level two cache 285 is typically much larger than each level one cache and hence is inherently slower to access, and additionally may be provided off-chip, thus further increasing the latency). Furthermore, the energy consumed in accessing a second on-chip cache is also less than would be incurred by accessing bulk memory or a level two cache.

In accordance with one embodiment of the present invention, the relevant identification logic 225, 245, 275 is arranged to mark the allocated cache line in the cache performing the linefill operation, or alternatively the identified cache line in the other level one cache that is servicing the linefill request, as preferred for eviction. In one particular embodiment, it is the allocated cache line in the cache the subject of the linefill operation that is marked as preferred for eviction. Hence, considering the earlier example where the linefill request from the level one cache 210 is serviced by the level one cache 260, the identification logic 225, or alternatively the identification logic 245, will cause the relevant cache line in the cache array 215 to be marked as preferred for eviction.

Such an approach is useful, since as mentioned above the cache linefill latency associated with that particular cache line now marked as preferred for eviction is relatively low, and hence if that cache line is subsequently evicted in preference to some other cache line which has not had its linefill request processed in such a way, this is overall more beneficial, given that that data is comparatively cheap to recover from another level one cache. Accordingly, by such an approach, there is a tendency to retain cache lines within a level one cache for which there is not a duplicate copy in one of the other level one caches, thereby reducing overall linefill times.

The relevant cache control logic 220, 270 can be extended to monitor the number of times that such a direct data intervention filled cache line is accessed by the CPU, and to remove the PFE status if the accesses exceed a threshold, allowing the retention of frequently referenced data locally within the relevant level one cache. Hence, considering the earlier example, if the cache line in the cache array 215 of the level one cache 210 that has been filled by copying the data from the cache array 265 of the level one cache 260 is then subsequently accessed frequently by the CPU 200, then the preferred for eviction identification that has been set in association with that cache line in the cache array 215 can then be cleared by the cache control logic 220, thereby overriding the initial PFE status. Alternatively, the PFE indication could be moved to the copy of that cache line in the other cache, e.g. in the above example, if the cache control logic 220, 270 determine that the CPU 200 is now more interested in the data than the CPU 250, the PFE indication can be removed from the relevant cache line in the cache array 215 and be set in relation to the corresponding data stored in the cache array 265.

In accordance with one embodiment of the present invention, which can also be illustrated schematically by FIG. 3, one of the CPUs 200, 250 negotiates with the cache coherency logic 295 for ownership for writing to a block of memory, and the other CPU may then cache the same block for read only purposes within its local level one cache. When the owning CPU writes to the cache line, that CPU notifies the other sharing CPU via the cache coherency logic 295 so that the sharing CPU can update its local copy in its level one cache.

Such a technique is known as a write update scheme. Write update schemes minimise the latency between a producer task updating a data value and a consumer task being able to read it. Write update schemes also typically reduce the number of cache invalidations/linefills that the coherent system has to process. However, an adverse consequence of such a scheme is increased bus and cache traffic, with corresponding impact on throughput and energy consumption. This is particularly disadvantageous if in the meantime the software running on the CPU that is storing a read only copy of the data value has moved to a different phase of execution and is no longer referring to that data value anyway, and hence the impact on throughput and energy consumption is entirely wasted. This becomes particularly problematic in large CMP systems where there are a larger number of CPUs.

Consider as an example a situation where the CPU 200 is granted write access to a block of memory, and the CPU 250 stores a local copy of some of the data values in that block of memory within the cache array 265 of its associated level one cache 260. If the CPU 200 updates a data value within that block of memory, and the cache coherency logic 295 determines that that data value is also stored locally within the cache array 265 of the level one cache 260, then an update signal is routed via the BIU 230, coherent bus fabric 240 and BIU 280 to the level one cache 260 to cause the relevant data value to be updated in the cache array 265. If however by that time the CPU 250 had lost interest in that particular data value, but it was still resident in the level one cache 260, then this update process is wasting energy consumption and adversely impacting throughput over the coherent bus fabric 240. Accordingly, it would be desirable to remove such data from the cache array 265 when it is no longer of interest. In accordance with one embodiment of the present invention, the identification logic 275 is arranged, when a write update is received from the coherent bus fabric 240 of the cache coherency logic 295 pertaining to a data value in a cache line of the cache array 265, to mark that cache line, as preferred for eviction.

If the CPU 250 subsequently accessed the relevant cache line, the PFE status would be removed, thus reducing the probability that that cache line would be evicted. If however the CPU 250 did not access the line, for example because it had no longer any interest in that data, then the fact that that line has been marked as preferred for eviction will increase the likelihood of that cache line being evicted, and hence increasing the likelihood in the future that such a broadcasting of update values pertaining to that cache line would no longer be needed. In the more general case for a system having multiple CPUs, it can be seen that such an approach tends to reduce the number of CPUs listening to write updates, since once those CPUs have lost interest in the data, the relevant cache line is more likely to be evicted sooner due to its associated PFE status.

Whilst the above example was based on the CPU 200 having write access, and the CPU 250 keeping copies of some data in its cache 260 for read-only purposes, it will be appreciated that the same approach can be used if instead the CPU 250 had write access and the CPU 200 was keeping a read-only copy of data in its cache 210.

In one embodiment, which can also be illustrated schematically with reference to FIG. 3, one of the CPUs 200, 250, or more generally any logic unit provided within the data processing apparatus, may cause a line of data to become established in a line of a cache associated with a CPU. Conventionally, lines of data are brought into a CPU's level one cache as a consequence of the memory being accessed by that CPU (so the CPU is "pulling" lines into its cache). However, in cache coherent multiprocessor systems, other CPUs (or "agents") can affect lines that are already within another processor's cache (typically either invalidating or updating them).

In accordance with a write push scheme, an external agent can cause a line to be established in the level one cache associated with a particular CPU. In effect, the agent is "pushing" the line into the cache from outside. One reason for wanting to do this is if an external agent wants to send a message to that CPU. The message could be written into memory and a signal sent to the relevant CPU, typically in the form of an interrupt. That CPU would then execute a software routine that reads the message, causing the message data to be linefilled into its level one cache. By pushing the message into that CPU's cache, the linefill latency at the handler routine can be avoided.

It is quite likely that the CPU will only need to refer to the contents of a message for a brief period of time, and therefore in accordance with one embodiment of the present invention the write push operation can indicate that the message provided by the data value(s) stored in the level one cache of that CPU by the write push operation should be marked as preferred for eviction from the outset.

The external agent pushing the message into a CPU's cache can be a DMA engine, or any other relevant master device within the data processing apparatus. In one particular embodiment, the external agent may in fact be one of the other CPUs in the data processing apparatus. Hence, by way of example, the CPU 200 could initiate the write push mechanism (for example by storing in a FIFO structure an identifier for the processor to which the message data is destined (in this case the CPU 250), the message data, and the address to which the message data should be written) to cause the message data to be stored in the cache array 265 of the level one cache 260 associated with the CPU 250. In accordance with the above-described embodiment of the present invention, the identification logic 275 or the identification logic 245 will cause that cache line in the cache array 265 to be marked as preferred for eviction. Alternatively the identification logic 225 could be arranged to issue the preferred for eviction indication to be routed to the cache 260.

As an alternative to the write push operation indicating the message data as preferred for eviction from the outset, the preferred for eviction indication could instead be generated by the relevant identification logic at the end of the handler routine executed by the CPU reading that message data. Hence, considering the earlier example, when the handler routine executed by CPU 250 completes, then the interrupt controller associated with the CPU 250 may be arranged to cause the identification logic 275 to mark the cache line as preferred for eviction.

In CMP systems, there are typically several levels of cache, forming a hierarchy towards the external memory. In general, the lower down the cache hierarchy (towards external memory), the more CPUs typically share that cache. The cost of evicting a line to external memory will have a high cost in terms of energy (due to the fact that external pins have high capacitance, the drivers on these pins have to have high drive strength, and also because off-chip voltages tend to be higher) and in terms of performance (refilling a cache with data from external memory will be slower).

In an embodiment of the present invention, which can also be illustrated with reference to FIG. 3, when a cache line is to be evicted from one of the level one caches 210, 260, the cache coherency logic 295 is arranged to determine whether to cause that cache line to be evicted to a lower memory level, for example the level two cache 285 assuming such a level two cache is provided, or if instead to cause that cache line to be stored in one of the other level one caches 260, 210 within the data processing apparatus (such a technique being known as eviction caching). If the cache coherency logic 295 determines that one of the other level one caches is to act as a recipient cache for the evicted cache line, the data values of the evicted cache line are caused to be stored within an allocated cache line of that recipient cache, and the identification logic is arranged to identify that cache line in the recipient cache as preferred for eviction.

Hence by way of example, if a cache line is to be evicted from the cache array 215 of the level one cache 210, the cache coherency logic 295 may decide to store that cache line into the cache array 265 of the level one cache 260, rather than demoting that cache line to the level two cache 285. In that instance, the cache control logic 270 will typically evict a cache line from the cache array 265 to make room for the cache line routed to it from the level one cache 210, and when that cache line is stored within the cache array 265, the identification logic 275 or the identification logic 245 is arranged to mark that cache line as preferred for eviction. Alternatively the identification logic 225 could be arranged to issue the preferred for eviction indication to be routed to the cache 260.

By such an approach, the cost of evicting data values to a lower memory level in the memory hierarchy can be reduced by instead placing an evicted cache line in another cache at the same memory level, even though such a cache is not naturally in the evicting CPU's "line of sight" (in the above example it will be appreciated that the level one cache 260 is not a cache which the CPU 200 is allowed to naturally allocate into). Whilst such an approach can reduce the energy and performance costs that might otherwise occur if the cache line were instead evicted to the level two cache 285, there is a trade-off in terms of the potential impact that this eviction caching technique has on the CPU associated with the recipient cache, in the above example the CPU 250. One example of where this trade-off works is if the evicted line is dirty, but instead of writing off-chip, it displaces a clean line that has not recently been used in the level one cache associated with a different CPU. The displaced clean line does not have to be written back off-chip, thereby representing an energy saving, and the other CPU was unlikely to re-use the clean line, thereby resulting in a low performance degradation of that other CPU.

However, it is important that the first CPU does not unfairly displace all of the lines of interest to the second CPU. For example, if the second CPU needs to allocate a new line in its cache, preference can be given to cache lines filled from another level one cache (also referred to herein as "eviction cached" lines) when choosing a candidate victim line, given the fact that in accordance with the above described embodiment such lines are marked with PFE status. The thinking behind this is that the "eviction cached" lines have already been given a second chance by being pushed into the second CPU's cache, rather than being evicted off-chip, but they may not warrant a third chance.

Hence, by marking an evicted cache line as preferred for eviction at the time it is stored within the cache line of the recipient cache, this helps to reduce any impact on the CPU associated with the recipient cache, since when it is subsequently required to evict a cache line from that recipient cache, that cache line marked as preferred for eviction will be chosen in preference to a cache line not marked as preferred for eviction.

Figure 4:
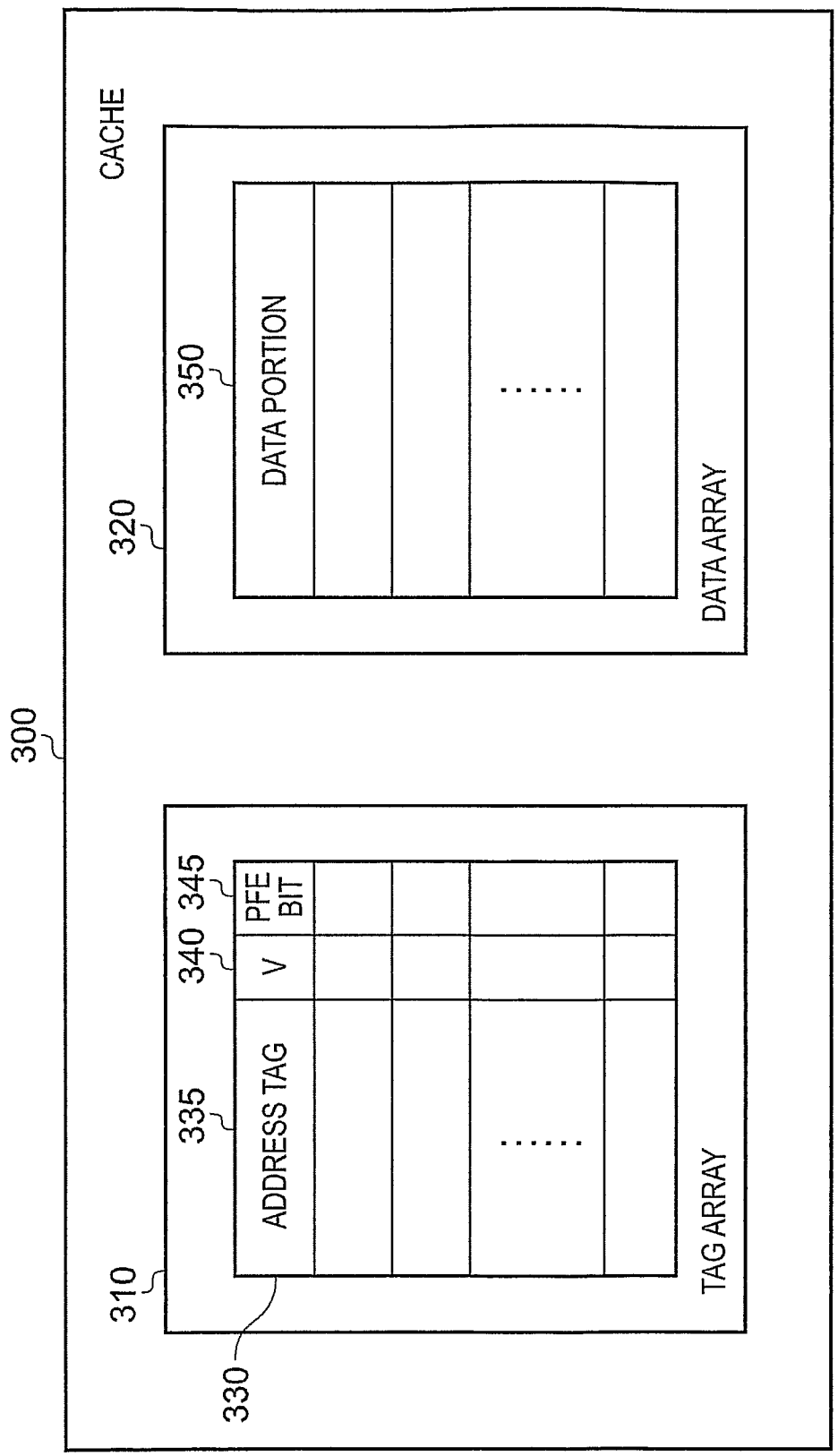
FIG. 4 is a diagram schematically illustrating a cache in accordance with one embodiment of the present invention.

FIG. 4 illustrates one embodiment of a cache 300 that may be used in embodiments of the present invention, where the preferred for eviction identifications issued by the identification logic are retained directly within the tag array of the cache. Hence, in this embodiment, the retention logic can be considered to be formed directly within the cache array. In a set associative cache, the element 300 shown in FIG. 4 would actually be one way of the cache, and that element would be replicated for each way of the cache.

As will be appreciated by those skilled in the art, the cache/cache way 300 would typically include a tag array 310 and a data array 320, the data array 320 including a data portion 350 comprising of a plurality of cache lines, each cache line typically storing a plurality of data values. For each cache line in the data portion 350, the tag array 310 will provide a corresponding tag line 330 storing an address tag value 335 associated with the data values in the corresponding cache line of the data portion 350. As will be appreciated by those skilled in the art, the address tag value is typically formed by a portion of an address. Typically, each line 330 in the tag array 310 also includes a valid field 340 which can be set to indicate whether the corresponding cache line is valid, and may additionally contain other fields, such as a dirty field (not shown) to indicate whether the contents of the corresponding cache line are clean or dirty.

In accordance with an embodiment of the present invention, a further field 345 is provided for storing a PFE bit indicating whether the corresponding cache line is preferred for eviction, this PFE bit being set based on the output from the associated identification logic. When the cache maintenance logic is seeking to choose a candidate cache line for eviction, it in one embodiment makes reference to the valid field 340 and PFE bit 345 associated with each possible cache line when making its decision as to which of those possible cache lines should be evicted. Considering the example of a set associative cache, the possible cache lines will be the set of cache lines identified by a set portion of the address issued with the memory access request that has resulted in a cache miss and the consequent linefill process resulting in the need for a cache line to be evicted. Assuming one of the cache lines in that set is already marked as invalid, then that cache line will generally be chosen in preference to a valid cache line. However, assuming that all of the cache lines in the set are valid, then the cache maintenance logic will make reference to the PFE bit 345 associated with each of the cache lines and will be arranged to select as the victim cache line for eviction a cache line whose PFE bit is set if such a cache line is present in the set.

Figure 5:
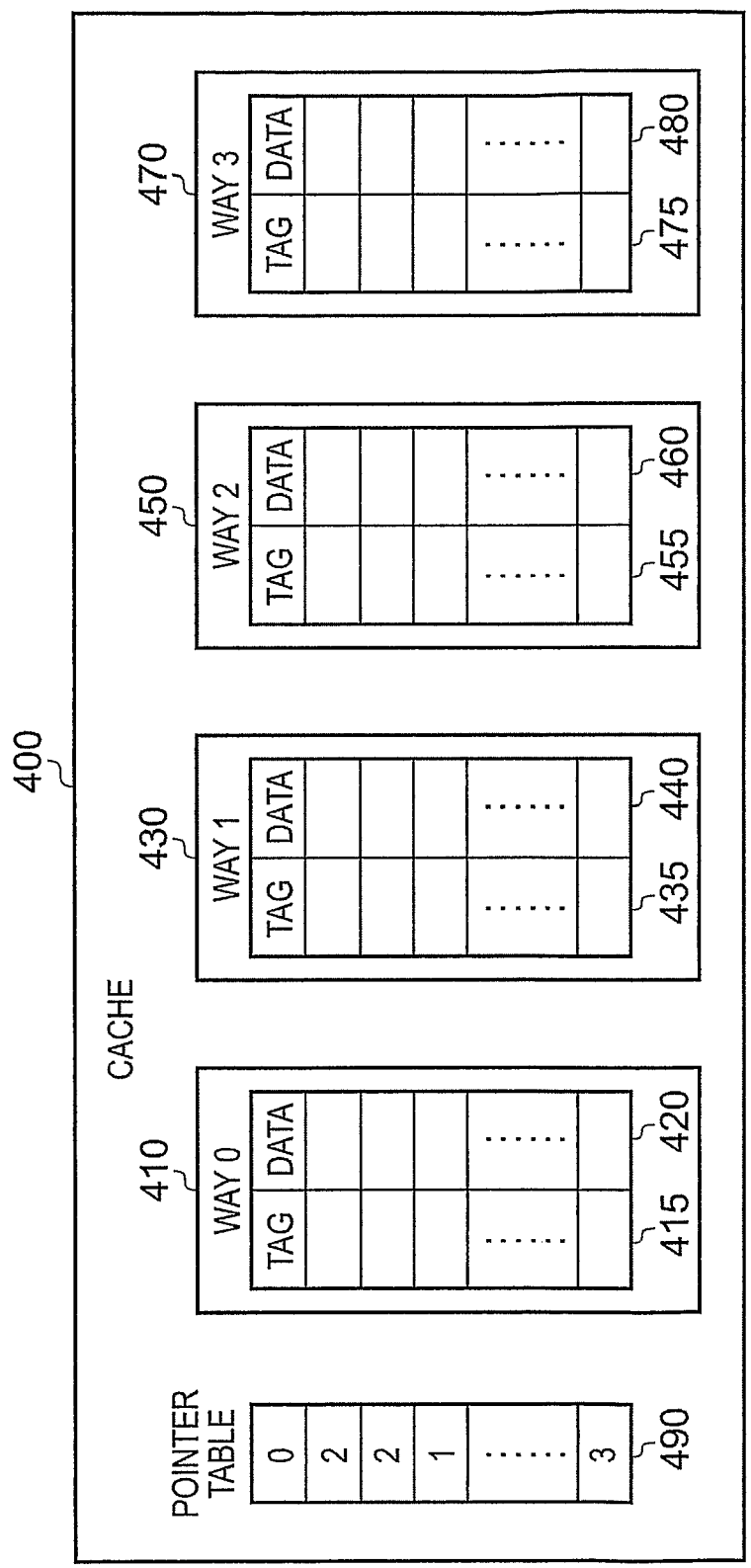
FIG. 5 is a diagram schematically illustrating a cache in accordance with an alternative embodiment of the present invention.

Providing a PFE bit 345 per cache line gives a fine level of granularity of preferred for eviction information which can be used by the cache maintenance logic when selecting a victim cache line for eviction. However, in some embodiments it may be considered that the overhead of providing a separate PFE bit for each cache line is unacceptable, and in such cases FIG. 5 illustrates an alternative embodiment that may be used which places less storage demands on the cache when storing PFE information. As shown in FIG. 5, a set associative cache 400 is provided consisting of a number of ways 410, 430, 450, 470. In this particular example, the set associative cache is a four way set associative cache. Each way 410, 430, 450, 470 has a tag array 415, 435, 455, 475 and a data array 420, 440, 460, 480. Further, a pointer table 490 is provided which an entry for each set, as mentioned earlier a set consisting of one cache line in each way. Based on the PFE indications issued by the identification logic, the cache 400 is then able to identify in each entry of the pointer table 490 a way whose cache line in the associated set is to be considered as preferred for eviction. Hence, considering the example shown in FIG. 5, the pointer table 490 illustrates that the cache line in way zero of the first set, the cache line in way two of the second and third sets, the cache line in way one of the fourth set, etc are marked as preferred for eviction. Such an approach hence reduces the storage requirements within the cache for holding preferred for eviction information, whilst still enabling a cache line per set to be marked as preferred for eviction. It will be appreciated that, dependent on the number of bits provided for each entry in the pointer table, the pointer table may in fact be able to indicate more than one way per set whose cache line is marked as preferred for eviction, but obviously the more bits provided for each entry in the pointer table 490, the larger the overall storage requirements within the cache 400 to store that preferred for eviction information.

It may be in some instances that there is no line in a particular set that has been indicated as PFE, and to support such an occurrence one possible encoding for an entry of the pointer table 490 may identify "no PFE" (for example by adding an extra bit per entry used to identify "no PFE" or by using one encoding of a non-extended entry). Alternatively, a default way, e.g. way 0, could be victimised if no other candidate is indicated by the PFE indications.

Figure 6:
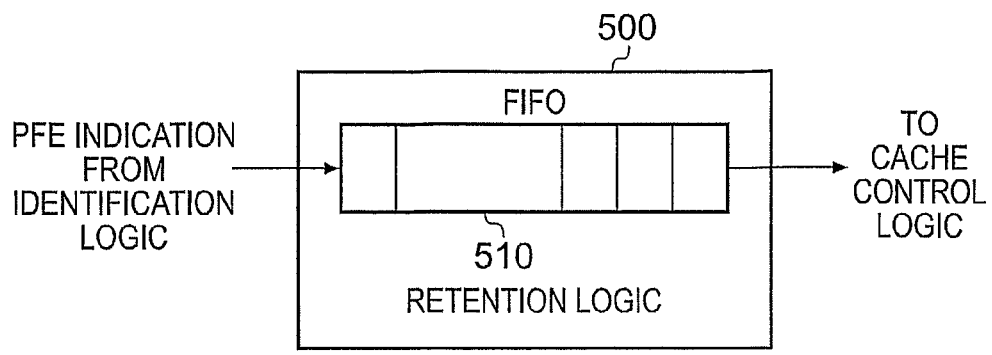
FIG. 6 is a diagram illustrating one embodiment of retention logic that may be used in a data processing apparatus in accordance with embodiments of the present invention.

FIG. 6 illustrates an alternative embodiment of retention logic which is stored separately to the tag array of the cache. The retention logic 500 shown in FIG. 6 may be provided within the cache, or external to it, and consists of a FIFO structure 510 for temporarily buffering the PFE indications issued by the identification logic. Each PFE indication issued by the identification logic is stored at the tail of the FIFO structure 510, and when a PFE indication reaches the head of the FIFO it is then output to the cache control logic. On receipt of that indication by the cache control logic, the cache maintenance logic is then used to evict the cache line identified by the preferred for eviction identification, this typically being performed as a background activity (i.e. not directly linked with any cache miss/linefill process). As a result, this approach aims to process the preferred for eviction indications whilst avoiding interrupting the progress of the CPU and its need to access the cache.

Figure 7:
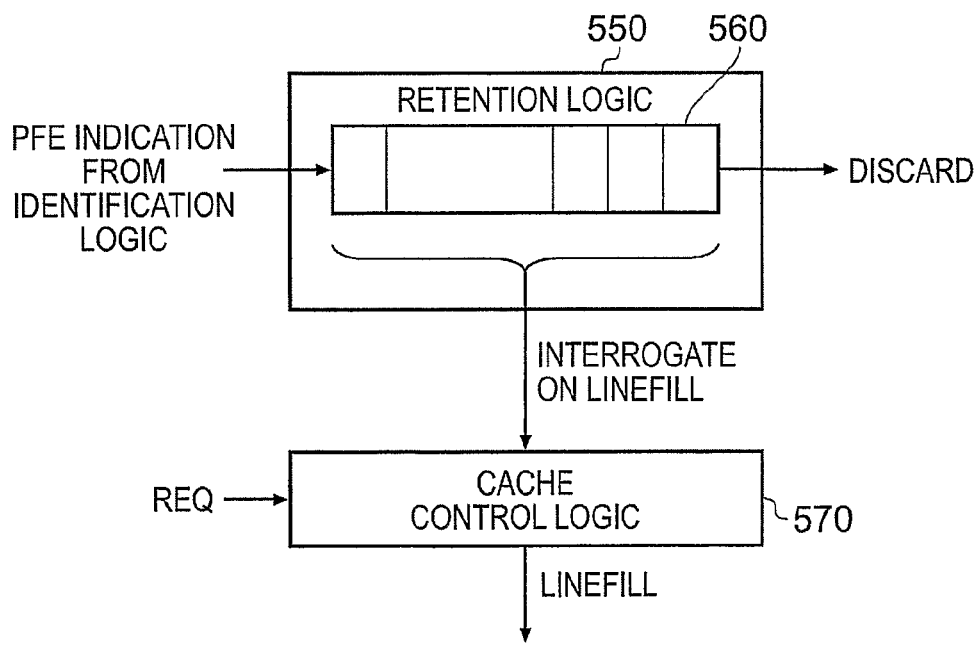
FIG. 7 is a diagram illustrating an alternative arrangement of retention logic that may be used in a data processing apparatus in accordance with embodiments of the present invention.

FIG. 7 illustrates an alternative embodiment of the retention logic which again is provided separately to the tag array of the cache, and may be provided within or external to the cache. In this instance, the retention logic 550 consists of an associative search FIFO structure 560, which like the FIFO structure 510 of FIG. 6 receives the PFE indications issued by the identification logic for storing at the tail of the FIFO. When the FIFO is full, each subsequent PFE indication received will result in the oldest stored PFE indication being discarded from the FIFO 560. It will be appreciated that this will not necessarily involve any data being output from the FIFO 560, since instead each new PFE indication received may merely overwrite an existing value, with the head and tail pointers into the FIFO structure 560 being updated accordingly.

When the cache control logic 570 within the associated cache receives a memory access request which results in a cache miss, then it will initiate a linefill procedure using its associated cache maintenance logic. During this linefill procedure, the contents of the associative search FIFO structure 560 will be interrogated by the cache maintenance logic to see if there is a cache line in the required set of the cache that has been indicated as preferred for eviction by the identification logic. If so, then that cache line will be chosen for eviction in preference to a cache line whose PFE indication is not set.

A fundamental decision to be made in respect of the retention logic is what form of information gets stored in it and how that information gets found at a later date. Two possible choices are either to record the address (or truncated address) of an access that was marked as PEE, or alternatively to record where in the cache such a marked access is located. This means each entry in the retention logic will contain either:

an address; or (for a set associative cache) a set/way indication

The set/way option has the benefit that it results in a simpler location of a candidate line for eviction when one is required. The address storage option requires less work up front by the identification logic and retention logic, but will generally require a second search step in order to identify a candidate victim cache line. The set/way, retention scheme is likely to work best with indication schemes that are linked to cache linefill activity (i.e. marking a line as PFE as it is filled into the cache), whilst the address retention scheme may be more favoured with indication schemes linked to memory transactions rather than cache linefill activity.

Considering the search facility that will be needed in respect of the retention logic, the original piece of information that will be provided is an address that misses in the cache, resulting in the need to do a linefill and the desire to identify a line to evict from the cache. Dependent on the information stored in the retention logic, the cache control logic will either search using address or set number (and set number is just a bit of the address).

The search item will then be compared against items stored in the retention logic—so either the address portion or set number will be stored in the retention logic entry as a tag.

In the case of the set/way storage scheme, a hit against the set number tag will result in the retention logic outputting the corresponding way number, together with a hit or 'match found' indication. The way number can be used to directly select a victim line in the required cache set.

In the case of the address storage scheme, a hit against the linefill address (portion) will indicate that there could be (is likely to be) a line in the cache corresponding to the retention logic entry, and that that cache line is preferred for eviction. The link has to be made between the retention logic entry and the line in the cache. This will typically require a second search phase—the matching retention logic entry will provide a tag portion (rest of address not used in search process), together with a hit or 'match found' indication. The cache control logic can then search the same cache set to see whether the output tag portion hits in the cache—if so this line is preferred for eviction. An optimisation to this route is to note that the search has occurred because of a miss in the first place—as a result all ways in the target set will have been searched and their tag portions read. If the cache system can arrange to keep these tag portions available after a cache miss then they can be used for the follow up victim match against a PFE entry. This can remove the need to search the tag RAMs a second time, thereby saving energy.

Overall, the set/way storage and search method is 'more elegant', as it results in a shorter, more efficient, etc. search process. In order to record set/way information, the PFE indication either has to be signalled close to the time that a linefill for that data occurs (e.g. pick up the set/way information as the line is established in the cache), or arrangements have to be made to search the cache to find the set/way for a given address. This search can be performed in cycles where the CPU is not accessing the cache for its own purposes (explicit data accesses).

Figure 8A:
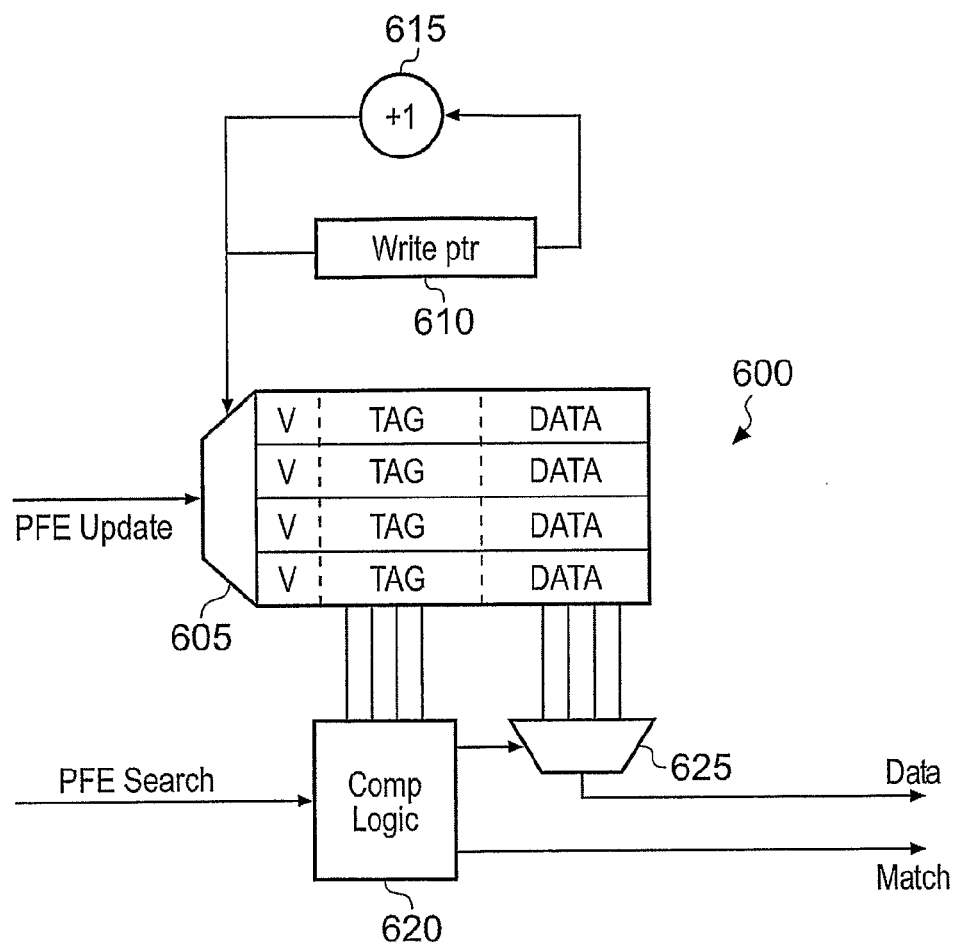
FIGS. 8A and 8B are diagrams illustrating alternative forms of retention logic shown in FIG. 7.
Figure 8B:
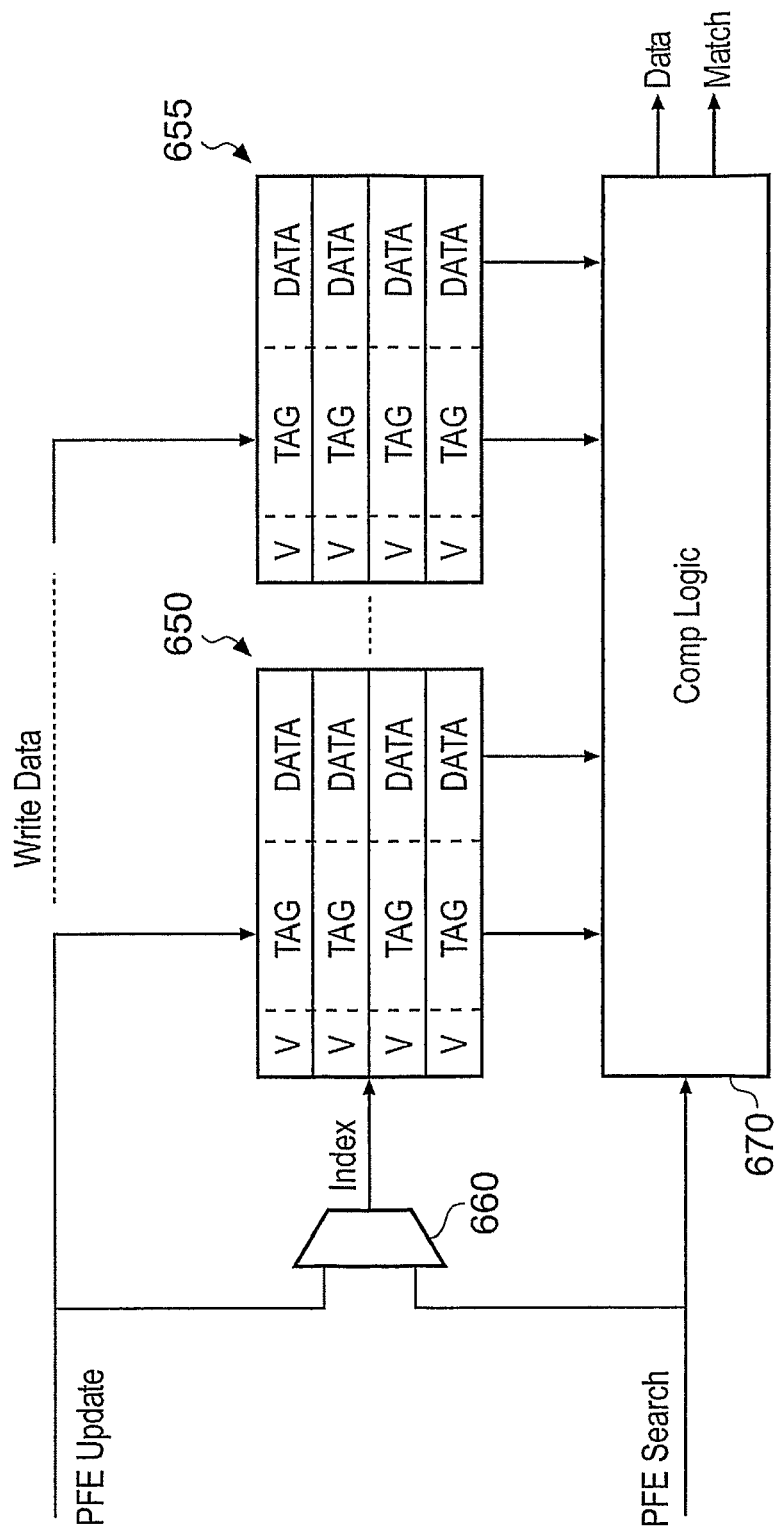

FIG. 8A provides details of a fully associative search FIFO scheme that could be used to implement the associative search FIFO structure of FIG. 7, and FIG. 8B provides details of an associative cache structure that could be used instead of the associative search FIFO structure of FIG. 7.

The general structure of both schemes is the same—an associative structure with a number of entries. The entries will each have a TAG value containing either an address (portion) or set/way information as described above. The difference comes down to how the associative search structure is arranged and managed.

The FIFO scheme illustrated in FIG. 8A will generally comprise a fully associative FIFO structure 600, so a PFE indication can be stored in any of the entries in the FIFO without restriction. The retention logic will be arranged as a FIFO to simplify the allocation policy—a new PFE indication will displace the oldest PFE indication retained by the retention logic. The FIFO could be implemented as a conventional shift register FIFO, or as shown in FIG. 8A by a RAM 600 with a write pointer 610. When a new PFE indication is to be placed into the FIFO, it gets written via demultiplexer 605 to the entry pointed to by the write pointer 610, and the write pointer gets incremented by incrementer 615. Every valid entry in the FIFO (as indicated by the valid flag V associated with each entry) needs to be searched by comparison logic 620 when a candidate victim is being located—this would mean either being able to read all entries in parallel for search purposes or cycling through the entries. When a hit is detected the data in the hit entry is output via multiplexer 625 along with a hit indication generated by the comparison logic 620. When using the earlier described set/way storage scheme, the data output will be the way number where the PFE cache line exists. When using the earlier described address storage scheme the data will be the rest of the address not used in the search process.

Under the associative cache scheme illustrated in FIG. 8B, a PFE indication has a more limited choice of where it can be stored in the retention logic structure, which comprises a number of ways 650, 655. The retention logic will be able to store a PFE indication into one of a number of potential locations. For example, in a 4-way set associative retention cache, a particular PFE indication must be stored within one of the four potential locations within the set that it maps to. The retention cache does not have to have the same associativity or number of sets as the cache that it is associated with. As an example, a 32-entry retention cache could be envisaged, having 4 sets of 8-ways. This could potentially track sufficient PFE indications for a much larger data cache.

When the associative cache retention logic receives a new PFE indication, it must locate an entry to place it into. For a given indication, part of the indication (an index) will get used as a set selector output by multiplexer 660, which will identify the target set in which the indication must be placed. From this point, any of the well known cache allocation policies could be used to choose the victim line in the retention cache—for instance random or round robin. When a search is required, the indication provided with the search will be used by multiplexer 660 to produce an index identifying a particular set whose entries are to be searched. The TAG and data portions of all valid entries in that set will then be provided to the comparison logic 670, and in the event of a hit being detected the data for the relevant entry will be output along with a match indication.

Figure 9:
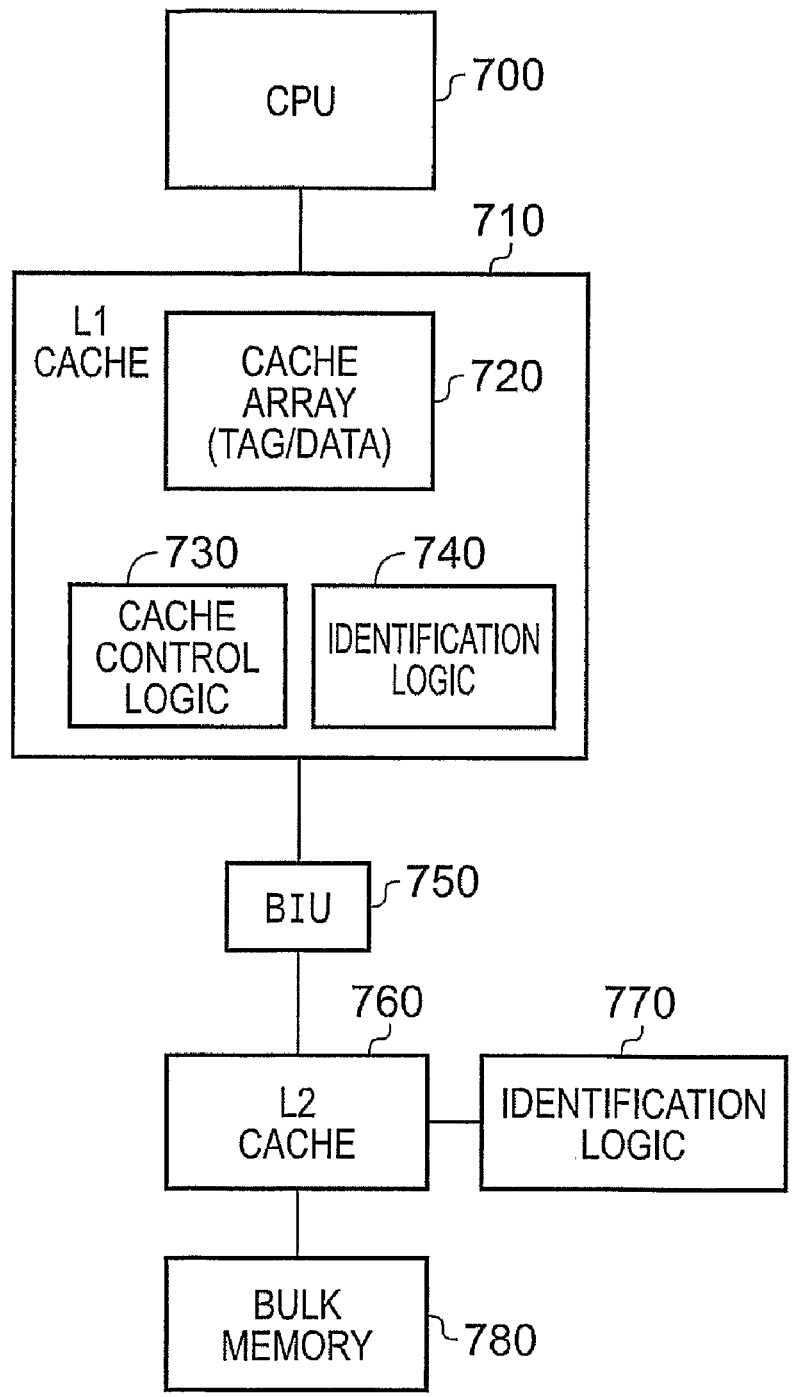
FIG. 9 is a block diagram of a data processing apparatus in accordance with an alternative embodiment of the present invention.

FIG. 9 illustrates an embodiment of the present invention where a CPU 700 is coupled with a memory hierarchy consisting of a level one cache 710, a level two cache 760 and bulk memory 780. As described earlier, for example with reference to FIG. 3, the level one cache 710 consists of a cache array 720 having tag and data portions, cache control logic 730, and identification logic 740 for generating preferred for eviction indications based on monitoring the data traffic passing through the level one cache. In this particular embodiment, the identification logic 740 is optional. The level one cache 710 is typically coupled to the level two cache through a bus interface unit 750. In accordance with this embodiment of the present invention, the level two cache 760 is provided with identification logic 770 for monitoring data traffic passing through the level two cache and based thereon to generate preferred for eviction indications to be associated with particular cache lines in the level two cache.

In accordance with this particular embodiment of the present invention, the identification logic 770 is arranged such that when the level two cache 760 services a linefill request from the level one cache 710, causing the data in one of the cache lines of the level two cache 760 to be promoted to the level one cache 710 for storing in a cache line of the cache array 720, then the identification logic 770 marks the corresponding cache line in the level two cache as preferred for eviction:

As a result, if it is subsequently required to evict a cache line from the level two cache 760, then that cache line which has been marked as preferred for eviction will be selected in preference to a cache line that has not been so marked. This has the result that the level one cache 710 and level two cache 760 tend towards operating in an exclusive manner, since data promoted from the level two cache into the level one cache will tend to be evicted from the level two cache in due course by virtue of the associated preferred for eviction indication. Hence, such a policy skews the cache allocation so that it tends towards exclusivity, thereby enabling the storage efficiency of exclusive caches to be realised, but without encountering some of the drawbacks. In particular, there is no need to remove the cache line from the level two cache 760 at the time the cache line is promoted from the level two cache to the level one cache (which would be required by a strictly exclusive cache), but instead that cache line in the level two cache is victimised ahead of other valid lines in the level two cache when subsequently an eviction from the level two cache is required. Further, in unified exclusive caches, the use of the preferred for eviction indication removes the problem of having the line artificially miss in the level two cache when accessing the level two cache with instruction addresses.

Regarding the first benefit mentioned above, namely the avoidance of removing the cache line from the level 2 cache at the time that the cache line is promoted, this is beneficial because the L2 cache read logic can be separated from the logic responsible for dealing with eviction. Further, it is common that L1 eviction logic may be similarly decoupled from L1 linefill logic; for example a L1 evicted line may be stored in an eviction buffer whilst a linefill is filling new data to that line. The write of the line stored in the eviction buffer may take place several cycles later, and it can simplify the design if this write is decoupled from the initial cache miss that caused data to be promoted up from L2.

The second benefit mentioned above is the removal of artificial line misses. In more detail the scenario for a true exclusive cache is as follows:
1. Data writes are used to update a code section at line address 1000. This line is cleaned to L2.
2. The L1 instruction cache is invalidated at line address 1000.
3. Before the L1 instruction cache fetches line address 1000, the data side may for some legitimate reason access address 1000 again (or another address within the same cache line). This line is established into the L1 Data side; under the rules of true exclusivity, the L2 copy of address 1000 must be invalidated.
4. The L1 instruction cache now requests line address 1000, and does not see the updated copy that is being held in the L1 data cache.

By not requiring the true exclusivity behaviour, but tending towards it, the L2 can retain a copy of a line promoted up to the L1 data cache. Since the retained copy will be visible to L1 instruction accesses, it can further be written back to external memory if evicted from L2, such that it is still visible to L1 instruction accesses even if the L2 cache has discarded that line.

Similarly to the instruction cache benefit, the tendency to exclusive property can assist other readers being able to benefit from the presence of the data in L2, whilst still indicating the entry as PFE for consideration in subsequent eviction scenarios.

Returning to the discussion of FIG. 9, when the cache line that has been promoted to the level one cache is subsequently written back to the level two cache (typically because it has been selected as a victim cache line to be evicted during a linefill process), then the level two cache will tend to allocate that cache line by evicting a clean line in the level two cache rather than a dirty line.

Returning to the discussion of FIG. 4, when adopting the use of a PFE bit 345 per cache line in a set associative cache, then this mechanism can be used in order to provide a modified Most Recently Used (MRU) cache replacement scheme which provides significant benefits over a standard MRU scheme. The known MRU scheme is in approximation of the well established Least Recently Used (LRU) replacement scheme. With the MRU scheme, a bit is associated with each cache line that indicates whether that line has been accessed since the last linefill. Upon a cache hit operation, this bit is set in the relevant cache line. Upon a linefill, the selected cache line that is filled from memory has its "accessed since last linefill" bit set, and all other lines (in that set for an associative cache) have their bit cleared. Upon the next linefill, the bits associated with all the lines in the relevant set are examined and preference for eviction is given to lines which have not been accessed since the last linefill, i.e. their "accessed since last linefill" bit is clear. The MRU scheme can hence be seen as introducing a status bit which tracks whether a line has been accessed recently.

Figure 10:
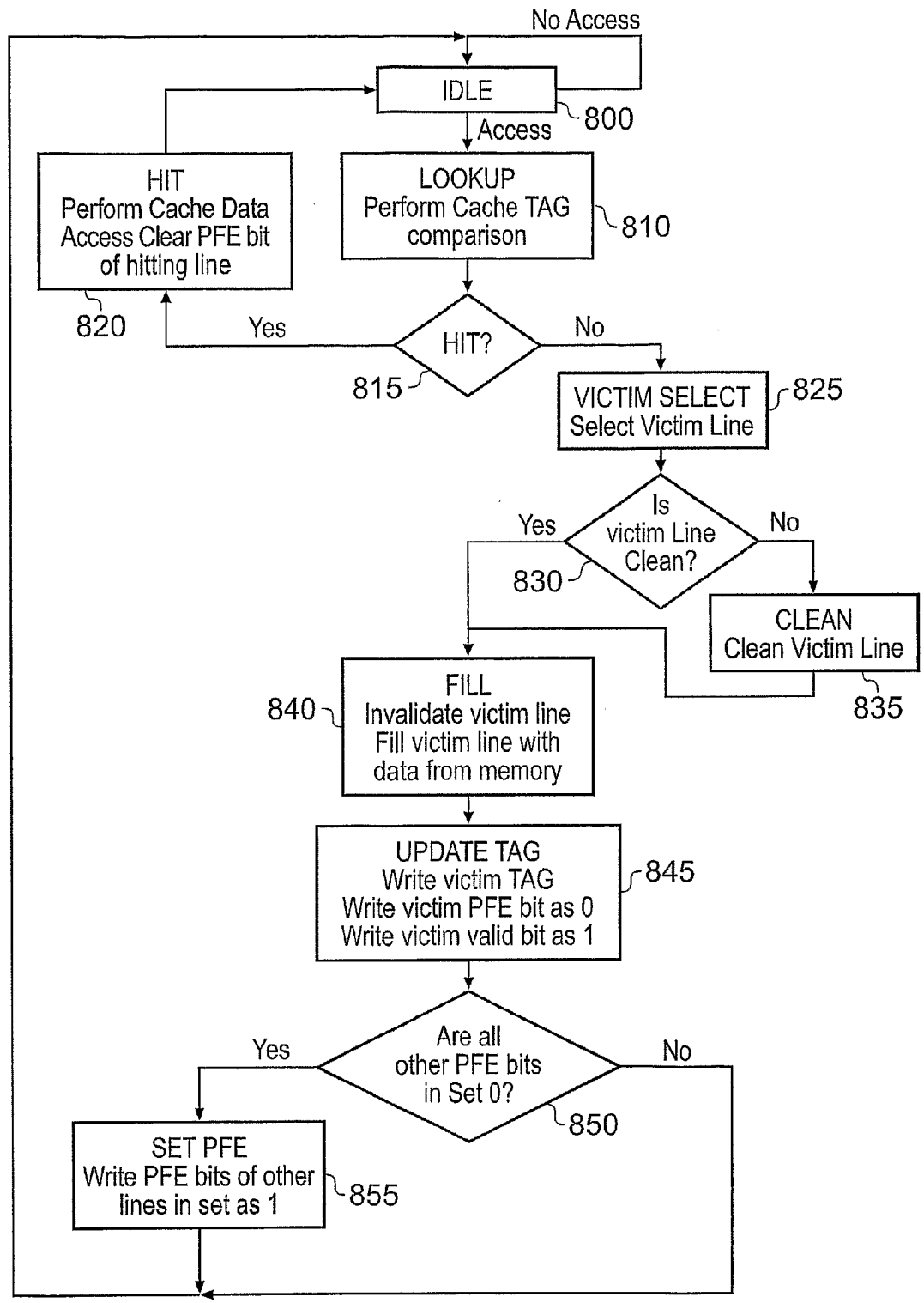
FIG. 10 is a flow diagram illustrating a method used to set and clear preferred for eviction bits associated with cache lines in accordance with one embodiment of the present invention.

Instead of using an "accessed since last linefill" bit, the embodiment of the present invention illustrated in FIG. 4 uses a PEE bit per cache line. FIG. 10 is a flow diagram illustrating a process which can be performed within a set associative cache whose ways are arranged as shown in FIG. 4 in order to implement a modified MRU scheme. At step 800, the cache control logic of the cache is in the idle state, but on receipt of an access request from the associated CPU, the process proceeds to step 810, where a lookup is performed by comparing the tag portion of the address specified by the access with the tag portions stored in each cache line of the relevant set (as indicated by a set portion of the address). If at step 815 it is determined that a hit has occurred within the cache, then the cache control logic performs at step 820 an access into the relevant cache line of the data portion of the cache in order to access the required data. Further, identification logic, which in this embodiment can be considered to be formed within the cache control logic, clears the PFE bit associated with that cache line, whereafter the process returns to the idle state 800.

If at step 815, it was determined that there was not a hit in the cache, then the process proceeds to step 825, where a victim selection process is performed. This process will be described in more detail with reference to FIG. 11, and results in the selection of a victim cache line for eviction from the relevant set of the cache. At step 830, it is determined whether that victim cache line is clean, and if not, the cache line is cleaned at step 835. As discussed earlier, this process will involve writing back to a lower memory level of the memory hierarchy any data values in the cache line that are more up-to-date than the corresponding values stored in the lower memory level of the memory hierarchy.

Thereafter, at step 840, or directly following step 830 in the event that the victim cache line is clean, the relevant cache line in the data portion of the cache is subjected to a fill process, during which the victim cache line is invalidated and then filled with the data retrieved from memory as part of the linefill process.

Thereafter, at step 845, the corresponding line in the tag array is updated by storing the relevant address tag value in the address tag portion 335, setting the valid bit 340 to one, and clearing the PFE bit 345 to zero.

Thereafter, at step 850, it is determined whether all other PFE bits in the set are also cleared, i.e. at a logic zero value. If not, no action is required and the process returns to the idle state 800, but if all of the other PFE bits in the relevant set are zero, then at step 855 the PFE bits of all of the other lines in the set, other than the one that has just been subjected to the linefill process, are set to one. It has been found that such a scheme has a longer time base than the prior art MRU scheme, which could erroneously evict lines recently fetched into the cache when lines not accessed for a long time are still resident in the cache. The described scheme achieves this longer time base by ensuring that it sets the PFE bits within a particular set only when there are no cache lines left in the set whose PFE bit is set.

Figure 11:
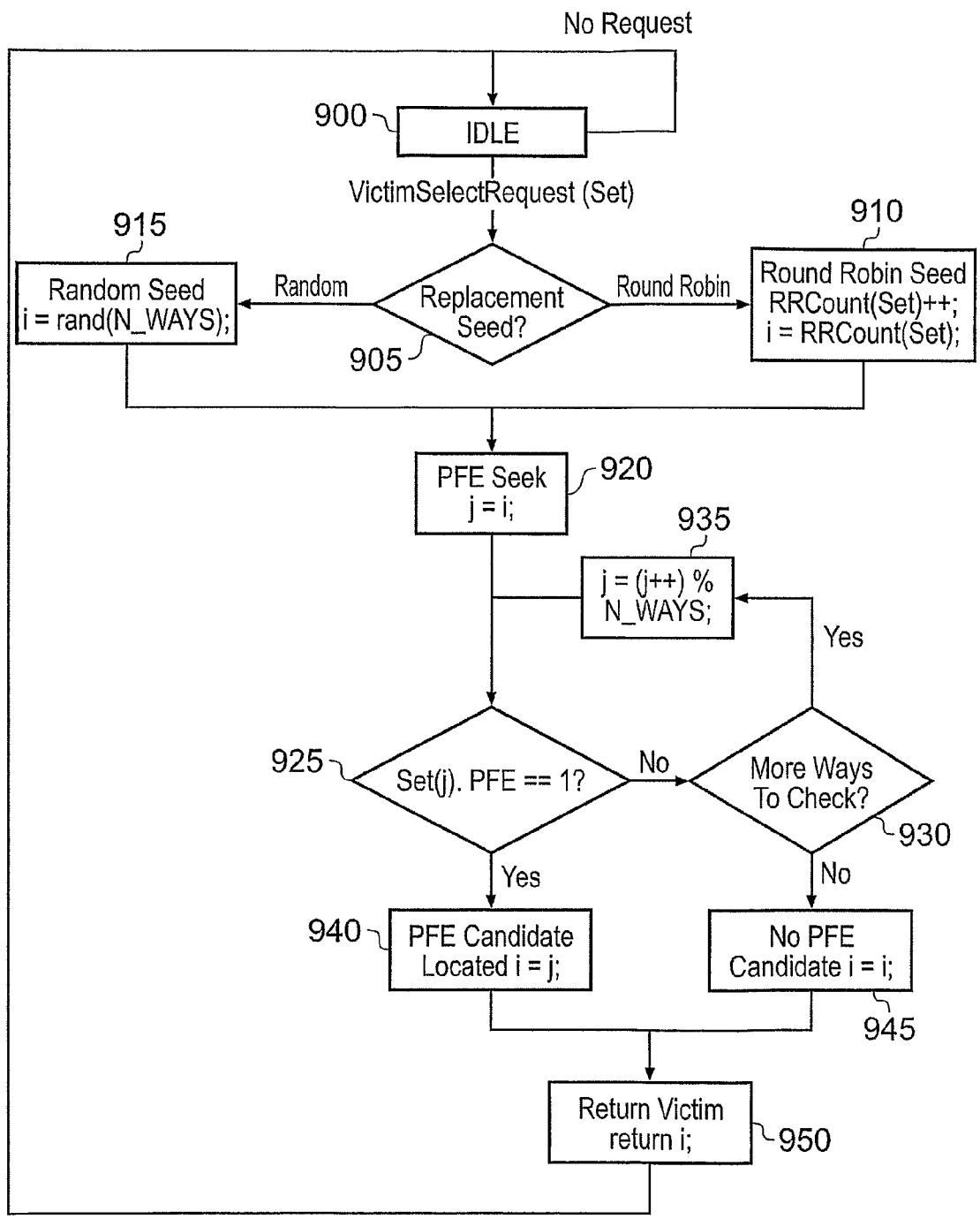
FIG. 11 is a flow diagram illustrating in more detail the victim selection step of FIG. 10 in accordance with one embodiment of the present invention.

FIG. 11 is a flow diagram illustrating the process performed to select a victim at step 825 in FIG. 10. At step 900, the cache maintenance logic of the cache control logic is in the idle state, with a variable "i" identifying a particular way. When a victim select request is received by the cache maintenance logic, then at step 905 a decision is made as to which replacement seed to use to identify a victim cache line. In particular, in accordance with one embodiment, this can be done using a random seed or a round-robin seed. For any particular implementation, the choice of replacement seed will normally be predetermined, for example by setting of a configuration control register.

Assuming a random seed is selected, then at step 915, an operation is performed to randomly select a way from the available N ways and to set the variable i equal to that identified way. If alternatively the round-robin seed is chosen, then at step 910 a round robin count for the relevant set is incremented, and the variable i is set to that incremented value in order to select the next way. For example, for a four-way set associative cache, if the round robin count for the relevant set was two at step 900, it would be updated to three at step 910. Similarly, if it was three at step 900, it would be updated to zero at step 910.

Once a value of i has been selected at either step 915 or step 910, then at step 920 a search for a preferred for eviction indication is initiated, at which point a variable j is set equal to the current value of the variable i. Thereafter, at step 925 the PFE bit 345 for the cache line in way j of the relevant set is reviewed to see if it is set. If it is, then at step 940 it is determined that the PFE candidate has been located, and the variable i is set equal to the current value of j. However, if at step 925 it is determined that the PFE bit is not set, then at step 930 it is determined whether there are any more ways to check. If there are, then at step 935 the value j is incremented, wrapping around if need be having regard to the total number of ways in the cache, i.e. if j is already three, then at step 935 the incrementation process will result in identifying the new j as zero for a four-way set associative cache.

Thereafter, steps 925, 930 and 935 are repeated iteratively until either a set PFE bit is located, or there are no more ways to check. If at step 930 it is determined that there are no more ways to check, then it is determined at step 945 that no PFE candidate has been found, and in that event the variable i is set equal to the current value of i (i.e. it is not updated as a result of the PFE seek process performed by steps 920, 925, 930, 935).

Thereafter, at step 950, which is reached from either step 940 or step 945, the victim cache line in way i is returned, whereafter, returning to FIG. 10, the process proceeds to step 830.

Hence, from the above description, it will be seen that with the improved scheme, when a line is accessed as a result of a cache hit, the PFE bit is cleared, and also upon a linefill the line that is filled from memory has its PFE bit cleared. All other lines in the relevant set retain their current PFE state unless doing so will result in no lines having their PFE bit set, in which case all lines other than the one that has just been filled have their PEE bit set. Optionally, even the line that has just been linefilled could have its PFE bit set. Upon the next linefill, the bits of all of the lines in the relevant set are examined and preference for eviction given to lines which have not been accessed since the last linefill, as will be indicated by a set PFE bit. If no lines have their PFE bits set, then a line is chosen at random, its PFE bit is cleared, and all other PFE bits in the way are set.

As mentioned earlier, it has been found that such a modified scheme has a longer time base than the prior art MRU scheme, which could erroneously evict lines recently fetched into the cache when lines not accessed for a long time are still resident in the cache.

Figure 12:
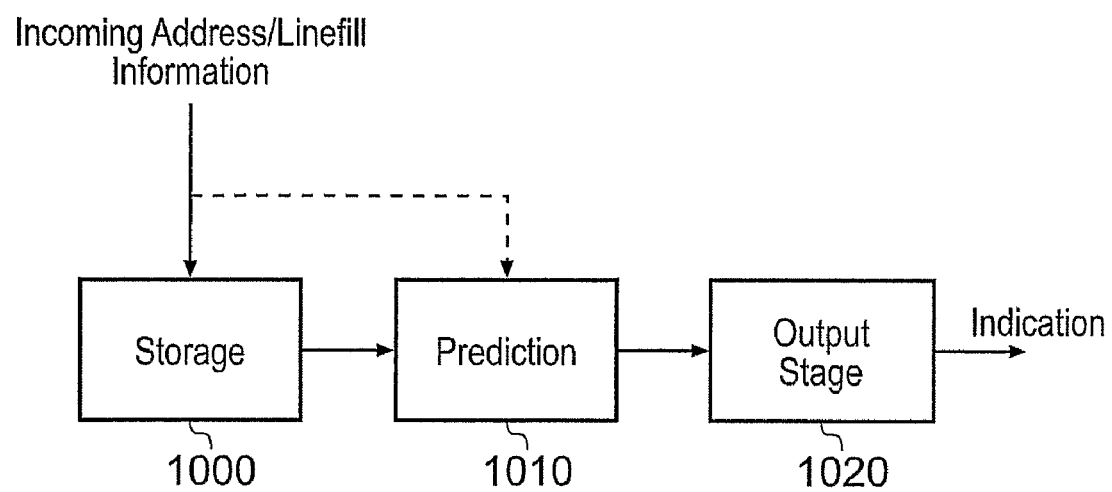
FIG. 12 is a block diagram schematically illustrating elements provided within identification logic in accordance with one embodiment of the present invention.

From the above embodiments of the present invention, it will be appreciated that the identification logic can take a variety of forms, and is used to monitor data traffic within the data processing apparatus. In one embodiment, the identification logic is associated with a cache and monitors data traffic passing through the associated cache. FIG. 12 schematically illustrates elements provided within such identification logic in accordance with one embodiment. As access events arise, incoming address and/or linefill information is routed to storage 1000, mid also to prediction logic 1010. Storage 1000 stores information about previous such access events, which can be used to determine whether there is a pattern of accesses emerging. The prediction logic 1010, which could be embodied as a state machine, is used to predict the presence of such patterns, and in particular is arranged to combine the information pertaining to a current access event with the stored information of previous access events in order to generate an indication of whether behaviour is falling within expected bounds (identification is possible or not). The prediction logic can also refer to local information retained about previous predictions, accuracy of predictions, trends over time, etc, or alternatively this information could be stored in the storage 1000. In one embodiment, the output from the prediction state machine 1010 is held inactive until a steady state is observed. The output logic then receives the output from the prediction logic 1010 and, possibly in combination with other inputs, determines whether to issue a preferred for eviction indication in association with the current access event, whether that be a load/store event, a linefill event, etc, so that if appropriate any cache line associated with that event can be marked as preferred for eviction.

From the above description of embodiments of the present invention, it will be appreciated that such embodiments provide an automated technique for achieving better utilisation of available cache storage by preferentially evicting data perceived to be of less importance, through marking such data as preferred for eviction. In contrast to prior art techniques, there is no need to perform any compiler analysis of the program to be executed by the data processing apparatus, nor is there any need to modify that program code to include explicit preferred for eviction hints, and as a result the embodiments of the present invention provide a great deal of flexibility in how the preferred for eviction indications are used to achieve better cache utilisation.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus comprising:
at least one processing unit operable to execute a sequence of instructions;
each of the at least one processing units having a cache associated therewith, each cache having a plurality of cache lines operable to store data values for access by the associated processing unit when executing the sequence of instructions;
identification logic operable for each cache to monitor data traffic within the data processing apparatus and based thereon to generate a preferred for eviction identification identifying one or more of the data values as preferred for eviction; and
cache maintenance logic operable for each cache to implement a cache maintenance operation during which selection of one or more data values for eviction from that cache is performed having regard to any preferred for eviction identification generated by the identification logic for data values stored in that cache, wherein:
the identification logic comprises transient data detection logic operable for each cache to detect when execution of the sequence of instructions by the associated processing unit is causing data values to be accessed which are of transient interest to the associated processing unit, the transient data detection logic being further operable to identify such data values of transient interest stored in that cache as preferred for eviction;
at least one of the at least one caches employs a write allocate policy, such that if a write data value output by the associated processing unit during a write operation results in a cache miss, a selected cache line in that cache is subjected to a linefill process; and
the identification logic comprises burst write detection logic operable to detect a situation where a series of write operations are issuing a plurality of write data values sufficient to fill a number of selected cache lines above a threshold value and to identify as preferred for eviction the data values of at least the selected cache lines subsequent to detection of the threshold value being exceeded.

2. A data processing apparatus as claimed in claim 1, further comprising:
identification retention logic operable for each cache to retain one or more preferred for eviction identifications generated by the identification logic for data values stored in that cache, for reference by the cache maintenance logic.

3. A data processing apparatus as claimed in claim 2, wherein for at least one cache associated with said at least one processing unit said identification retention logic comprises a FIFO structure.

4. A data processing apparatus as claimed in claim 3, wherein said cache maintenance logic is operable in response to each preferred for eviction identification output from the FIFO structure to implement said cache maintenance operation.

5. A data processing apparatus as claimed in claim 2, wherein:
for at least one cache associated with said at least one processing unit said identification retention logic comprises a lookup structure containing an indication of cache lines identified by preferred for eviction identifications issued by the identification logic; and
said cache maintenance operation is implemented by the cache maintenance logic during a linefill operation, the cache maintenance logic being operable to reference the lookup structure in order to seek to detect a candidate cache line for eviction.

6. A data processing apparatus as claimed in claim 5, wherein the lookup structure is an associative search FIFO structure or an associative search cache structure.

7. A data processing apparatus as claimed in claim 1, wherein the transient data detection logic comprises streaming detection logic, and the data values of transient interest are a stream of data values.

8. A data processing apparatus as claimed in claim 1, further comprising:
prefetch logic operable for each cache to prefetch data values from memory for storing in that cache in anticipation of those data values being required to be accessed by the associated processing unit, the prefetch logic comprising said identification logic such that prefetched data values of transient interest are identified as preferred for eviction.

9. A data processing apparatus as claimed in claim 1, wherein said at least one processing unit comprises a plurality of processing units, the data processing apparatus further comprising:
cache coherency logic operable to manage coherency between each of the caches associated with the plurality of processing units;
for each cache, in the event of a cache miss occurring an allocated cache line being subjected to a linefill process;
if the cache coherency logic determines that the linefill process can be serviced by data values stored in an identified cache line of one of the other caches, then the data values being loaded into the allocated cache line from that identified cache line of said other cache, and the identification logic being operable to identify the data values of at least one of that allocated cache line and said identified cache line as preferred for eviction.

10. A data processing apparatus as claimed in claim 1, further comprising:
a logic unit operable to issue one or more data values to be read by one of said at least one processing units for storing in the cache associated with that processing unit;
the identification logic being operable to identify those data values within that cache as preferred for eviction.

11. A data processing apparatus as claimed in claim 10, wherein said at least one processing unit comprises a plurality of processing units, and said logic unit is one of said plurality of processing units.

12. A data processing apparatus as claimed in claim 1, wherein for at least one cache associated with said at least one processing unit each cache line has associated therewith a preferred for eviction field which is set in dependence on the preferred for eviction identification produced by the identification logic.

13. A data processing apparatus as claimed in claim 1, wherein for at least one cache associated with said at least one processing unit that cache is an n-way set associative cache, each set having a preferred for eviction pointer which is settable in dependence on the preferred for eviction identification produced by the identification logic to enable at least one cache line per set to be marked as preferred for eviction.

14. A data processing apparatus as claimed in claim 1, wherein the cache maintenance logic comprises background cache maintenance logic.

15. A data processing apparatus comprising:
at least one processing unit operable to execute a sequence of instructions;
each of the at least one processing units having a cache associated therewith, each cache having a plurality of cache lines operable to store data values for access by the associated processing unit when executing the sequence of instructions;
identification logic operable for each cache to monitor data traffic within the data processing apparatus and based thereon to generate a preferred for eviction identification identifying one or more of the data values as preferred for eviction; and
cache maintenance logic operable for each cache to implement a cache maintenance operation during which selection of one or more data values for eviction from that cache is performed having regard to any preferred for eviction identification generated by the identification logic for data values stored in that cache, wherein said at least one processing unit comprises a plurality of processing units, the data processing apparatus further comprising:
cache coherency logic operable to manage coherency between each of the caches associated with the plurality of processing units;
for a particular block of memory addresses, the cache coherency logic being operable to dynamically grant one processing unit ownership for writing data values associated with that block of memory addresses, with the other processing units being allowed only to store those data values within their associated cache for read access;
when said one processing unit updates a data value associated with that block of memory addresses, said one processing unit being operable to broadcast the updated data value via the cache coherency logic to any caches associated with the other processing units that are storing a copy of that data value for read access, so as to cause said caches to update their copy of that data value;
the identification logic being operable for those caches receiving the updated data value via the cache coherency logic to cause a cache line containing a copy of that data value for read access to be identified as preferred for eviction.

16. A data processing apparatus comprising:
at least one processing unit operable to execute a sequence of instructions;
each of the at least one processing units having a cache associated therewith, each cache having a plurality of cache lines operable to store data values for access by the associated processing unit when executing the sequence of instructions;
identification logic operable for each cache to monitor data traffic within the data processing apparatus and based thereon to generate a preferred for eviction identification identifying one or more of the data values as preferred for eviction; and
cache maintenance logic operable for each cache to implement a cache maintenance operation during which selection of one or more data values for eviction from that cache is performed having regard to any preferred for eviction identification generated by the identification logic for data values stored in that cache, wherein:
said at least one processing unit comprises a plurality of processing units;
a memory hierarchy exists within the data processing apparatus having a number of memory levels, each of the caches associated with the plurality of processing units being provided at one memory level, and when processing access requests issued by the processing units memory levels higher in the hierarchy being accessed before memory levels lower in the hierarchy;
the data processing apparatus further comprising:
cache coherency logic operable to manage coherency between each of the caches associated with the plurality of processing units;
when the data values of a cache line are to be evicted from one of said caches at said one memory level, the cache coherency logic is operable to determine whether to cause that cache line to be evicted to a lower memory level of the memory hierarchy or if instead to cause one of the other caches at said one memory level to act as a recipient cache, and if the cache coherency logic determines that one of the other caches at said one memory level is to act as the recipient cache, the data values of the evicted cache line are caused to be stored within a cache line of the recipient cache and the identification logic is operable to identify that cache line in the recipient cache as preferred for eviction.

17. A data processing apparatus comprising:
at least one processing unit operable to execute a sequence of instructions;
each of the at least one processing units having a cache associated therewith, each cache having a plurality of cache lines operable to store data values for access by the associated processing unit when executing the sequence of instructions;
identification logic operable for each cache to monitor data traffic within the data processing apparatus and based thereon to generate a preferred for eviction identification identifying one or more of the data values as preferred for eviction; and
cache maintenance logic operable for each cache to implement a cache maintenance operation during which selection of one or more data values for eviction from that cache is performed having regard to any preferred for eviction identification generated by the identification logic for data values stored in that cache, wherein:
for at least one cache associated with said at least one processing unit the cache maintenance logic is provided by a cache controller used to reference the preferred for eviction identification when selecting a victim cache line for eviction from that cache as part of a linefill process and said at least one cache is an n-way set associative cache;
for said at least one cache each cache line has associated therewith a preferred for eviction field which is set in dependence on the preferred for eviction identification produced by the identification logic, the identification logic being provided by the cache controller;
in the event of a cache hit occurring in a cache line of that cache the identification logic being operable to cause the preferred for eviction field associated with that cache line to be cleared;

in the event of a cache miss occurring in a cache line of that cache an allocated cache line being subjected to a linefill process, and the identification logic being operable to cause the preferred for eviction field associated with that allocated cache line to be cleared;

wherein if the clearing of the preferred for eviction field associated with the allocated cache line will result in no cache lines in the set containing the allocated cache line having preferred for eviction fields which are set, then the identification logic is further arranged, for that set, to cause the preferred for eviction fields associated with all cache lines in that set other than the allocated cache line to be set.

18. A data processing apparatus comprising:

at least one processing unit operable to execute a sequence of instructions;

each of the at least one processing units having a cache associated therewith, each cache having a plurality of cache lines operable to store data values for access by the associated processing unit when executing the sequence of instructions;

identification logic operable for each cache to monitor data traffic within the data processing apparatus and based thereon to generate a preferred for eviction identification identifying one or more of the data values as preferred for eviction; and cache maintenance logic operable for each cache to implement a cache maintenance operation during which selection of one or more data values for eviction from that cache is performed having regard to any preferred for eviction identification generated by the identification logic for data values stored in that cache, wherein a memory hierarchy exists within the data processing apparatus having a number of memory levels, for each cache associated with said at least one processing unit that cache being provided at one memory level, and when processing access requests issued by the processing units memory levels higher in the hierarchy being accessed before memory levels lower in the hierarchy, the data processing apparatus further comprising:

an additional cache provided at another memory level lower than said one memory level, said additional cache having additional identification logic associated therewith for identifying one or more of the data values stored in the additional cache as preferred for eviction;

when a data value is promoted from the additional cache for storage in a cache at said one memory level as part of a linefill process of the cache, the additional identification logic being operable to identify that data value as stored within the additional cache as preferred for eviction.

19. A method of managing at least one cache within a data processing apparatus having at least one processing unit for executing a sequence of instructions, each of the at least one processing units having a cache associated therewith, each cache having a plurality of cache lines for storing data values for access by the associated processing unit when executing the sequence of instructions, the method comprising the steps of:

(a) for each cache, monitoring data traffic within the data processing apparatus to detect when execution of the sequence of instructions by the associated processing unit is causing data values to be accessed which are of transient interest to the associated processing unit, and based thereon generating a preferred for eviction identification identifying one or more of the data values of transient interest as preferred for eviction; and (b) for each cache, implementing a cache maintenance operation during which selection of one or more data values for eviction from that cache is performed having regard to any preferred for eviction identification generated at said step (a) for data values stored in that cache, wherein at least one cache employs a write allocate policy, such that if a write data value output by the associated processing unit during a write operation results in a cache miss, a selected cache line in that cache is subjected to a linefill process; and (c) detecting a situation where a series of write operations are issuing a plurality of write data values sufficient to fill a number of selected cache lines above a threshold value and identifying as preferred for eviction the data values of at least the selected cache lines subsequent to detection of the threshold value being exceeded.

20. A data processing apparatus comprising:

at least one processing means for executing a sequence of instructions;

each of the at least one processing means having a cache means associated therewith, each cache means having a plurality of cache lines for storing data values for access by the associated processing means when executing the sequence of instructions;

identification means for monitoring, for each cache means, data traffic within the data processing apparatus and based thereon to generate a preferred for eviction identification identifying one or more of the data values as preferred for eviction; and cache maintenance means for implementing, for each cache means, a cache maintenance operation during which selection of one or more data values for eviction from that cache means is performed having regard to any preferred for eviction identification generated by the identification means for data values stored in that cache means, wherein the identification means comprises transient data detection means for detecting, for each cache means, when execution of the sequence of instructions by the associated processing means is causing data values to be accessed which are of transient interest to the associated processing means, the transient data detection means further identifying such data values of transient interest stored in that cache means as preferred for eviction;

at least one of the cache means employs a write allocate policy, such that if a write data value output by the associated processing means during a write operation results in a cache miss, a selected cache line in that cache means is subjected to a linefill process; and the identification means comprises burst write detection means for detecting a situation where a series of write operations are issuing a plurality of write data values sufficient to fill a number of selected cache lines above a threshold value and to identify as preferred for eviction the data values of at least the selected cache lines subsequent to detection of the threshold value being exceeded.

* * * * *